(12) United States Patent
Marti et al.

(10) Patent No.: US 8,135,128 B2
(45) Date of Patent: Mar. 13, 2012

(54) ANIMATRONIC CREATURES THAT ACT AS INTERMEDIARIES BETWEEN HUMAN USERS AND A TELEPHONE SYSTEM

(75) Inventors: Stefan Johannes Walter Marti, San Francisco, CA (US); Christopher Schmandt, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1495 days.

(21) Appl. No.: 11/601,386

(22) Filed: Nov. 18, 2006

(65) Prior Publication Data

US 2007/0217586 A1 Sep. 20, 2007

Related U.S. Application Data

(60) Provisional application No. 60/738,271, filed on Nov. 19, 2005.

(51) Int. Cl.
*H04M 1/00* (2006.01)

(52) U.S. Cl. ............... 379/372; 379/142.15; 455/556.1; 700/245

(58) Field of Classification Search ............... 379/419, 379/422, 420.01, 372, 142.15; 455/556.1; 700/245
See application file for complete search history.

(56) References Cited

U.S. PATENT DOCUMENTS

| 5,746,602 A * | 5/1998 | Kikinis | 434/169 |
| 2005/0078816 A1* | 4/2005 | Sekiguchi et al. | 379/419 |
| 2008/0274769 A1* | 11/2008 | Linden | 455/556.1 |

FOREIGN PATENT DOCUMENTS

JP 2000341374 A * 12/2000

* cited by examiner

*Primary Examiner* — Simon Sing
*Assistant Examiner* — Simon King
(74) *Attorney, Agent, or Firm* — Stephen Otis

(57) ABSTRACT

An animatronic telephone agent consisting of a communications subsystem connected to a wired or wireless telephone network for receiving incoming telephone calls, and a robotic automaton coupled to the communications subsystem and responsive to incoming telephone calls for performing different movements that provide non-verbal visual cues to a human observer that are indicative of the status of each incoming call. The automaton preferably takes the form of an animatronic device that has movable appendages and a face with at least movable eyes or eyelids and which provides visual cues by making gestures and/or exhibiting facial expressions that are indicative of the receipt and progress of incoming calls.

36 Claims, 15 Drawing Sheets

ANIMATRONIC CREATURES THAT ACT AS INTERMEDIARIES BETWEEN HUMAN USERS AND A TELEPHONE SYSTEM

CROSS REFERENCE TO RELATED APPLICATIONS

This application is a non-Provisional of U.S. patent application Ser. No. 60/738,271 filed on Nov. 19, 2006, the disclosure of which is incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

A computer program listing appendix is stored on each of two duplicate compact disks which accompany this specification. Each disk contains computer program listings which illustrate implementations of the invention. The listings are recorded as ASCII text in IBM PC/MS DOS compatible files which have the names, sizes (in bytes) and creation dates listed below:

| File Name | Bytes | Created |
| --- | --- | --- |
| animatronics_control_software.txt | 134,866 | Nov. 04, 2006 |
| conversational_agent_software.txt | 29,745 | Nov. 04, 2006 |
| conversation_finder_firmware.txt | 36,134 | Nov. 04, 2006 |
| finger_ring_firmware.txt | 13,425 | Nov. 13, 2006 |
| issue_detection_scripts.txt | 36,453 | Nov. 13, 2006 |
| sensor_node_control_software.txt | 126,807 | Nov. 04, 2006 |

FIELD OF THE INVENTION

This invention relates to interactive telephone call processing systems and more particularly to a robotic automaton that assists a telephone user.

SUMMARY OF THE INVENTION

The following summary provides a simplified introduction to some aspects of the invention as a prelude to the more detailed description that is presented later, but is not intended to define or delineate the scope of the invention.

Today's cellphones are passive communication portals. They are neither aware of our conversational settings, nor of the relationship between caller and callee, and often interrupt us at inappropriate times. The present invention adds elements of human style social intelligence to our communication devices in order to make them more socially acceptable to both a user and others who are near to and perhaps conversing with the user.

A preferred embodiment of the invention takes the form of communications control system for handling incoming calls or messages from a caller directed to a callee. The control system employs an interactive animatronic creature that contains one or more mechanical actuators for performing a set of pet-like or human-like movement behaviors in response to commands to provide non-verbal cues to the callee which indicate the status of the incoming call. A call processor receives and handles an incoming telephone call from a caller directed to said callee and includes a call progress monitor for generating status signals that indicate the current status of the incoming call. An animatronic command generator coupled to the call processor and to the interactive animatronic creature converts the status signals into movement command signals which are delivered to the creature's mechanical actuators, causing it to perform selected movement behaviors.

An authoring subsystem is preferably included in the control system for creating and storing a sequence of said movement command signals which, when delivered to a creature's mechanical actuators, produces one of the movement behaviors. The authoring subsystem includes a manual "slider" control operable by a human developer for creating and storing a separate sequence of movement command signals for delivery to each actuator. The mechanical actuators to move at a speed that mimics the speed at which the human developer moves the manual slider control. A sequence control is employed for repeatedly transmitting a selected previously created and stored sequence of said movement command signals to move an actuator, and for accepting modifications by the developer to the selected stored sequence to thereby create a modified stored sequence.

Sequences are preferably stored as named files in a command file library. The developer may select and combine specific named data files from said command library to create named files containing combined sequences of movement commands. Two or more different animatronic creatures having different behaviors may be coupled to the command generator which stores different sequences of said movement command signals for each of the different animatronic creatures. The command generator responds to a given status signal by sending the set of movement command that cause the specific creature to perform movements that are indicative of the status specified by the given status signal. In this way, the creatures may be interchanged without altering the function of the call progress monitoring program.

The animatronic creatures typical have movable appendages which can exhibit all or part of a behavior indicating a particular status condition. In addition, the creature typically has one or more movable eyes or eyelids and that can move to perform all or part of a desired behavior. The creature also includes control inputs, such as manually operated switches, for accepting control inputs from a user, as well as a microphone and a speaker for exchanging spoken prompts and responses with the user.

The animatronic creature typically takes the form of a small wireless robotic stuffed animal in the form of a squirrel, bunny, or parrot that employs intuitive non-verbal cues such as gaze and gestures to attract attention, instead of ringing or vibration. By providing subtle yet public alerts, the animatronics evokes significantly different reactions than ordinary telephones and are seen as less invasive by others present when we receive phone calls.

The animatronic device further acts as dual conversational agent that can whisper and listen to the user, and converse with a caller, mediating between them in real time. The Intermediary may modify its conversational script depending on caller identity, caller and user choices, and the conversational status of the user. It interrupts and communicates with the user when it is socially appropriate, and may break down a synchronous phone call into chunks of voice instant messages.

These and other objects, features and advantages of the invention may be better understood by considering the following detailed description.

BRIEF DESCRIPTION OF THE DRAWINGS

In the detailed description which follows, frequent reference will be made to the attached drawings, in which.

DETAILED DESCRIPTION

Implementation

The preferred embodiment of the invention described below is an Autonomous Interactive Intermediary that consists of a combination of computer hardware (PC level, microcontroller level, other electronics), software (see the accompanying computer program listing appendix), a variety of radio transceivers (433 Mhz, 2.4 GHz), and animatronic parts (servos, sensors).

System Overview

The preferred embodiment of the invention operates as an "Intermediary" that helps manage communications between the "user" of the Intermediary and remote persons (via one or more communications networks) as well as between the user and nearby persons with whom the user may be conversing. Ideally, an Intermediary is a completely autonomous, self-contained entity, preferably a small animatronic "creature," that is meant to be a permanent companion of the user: wherever she goes, the Intermediary is with her. An Intermediary can be carried or worn, but in order not to bother the user, it should not be larger than the size of a cellphone.

As described below, the Intermediary's computationally intensive processes run on a desktop computer. The actual agent software runs on this computer and communicates with the Intermediary via a wireless audio and data link. This approach is commonly referred to as "remote brain robotics," and was chosen to test paradigms and implement functionality that cannot be implemented using the limited resources commonly available with conventional cellphones. However, the ultimate goal is to run all agent processes on the user's phone or a telephone base station and control the Intermediary via short-range wireless link, or alternatively to integrate phone and Intermediary into one device altogether.

But even when cellphone and animatronics can be integrated and miniaturized into one tiny device, the Intermediary still relies on a sensor network that cannot be part of the cellphone itself. Ultimately, each person may wear one or several tiny sensor nodes, either in the shape of jewelry (including wrist bracelets, belt buckles, rings, etc.), or sewn directly into the clothes. These nodes will form an adhoc and completely decentralized sensor network that will serve as a shared resource for all Intermediaries in proximity.

Figure 1:
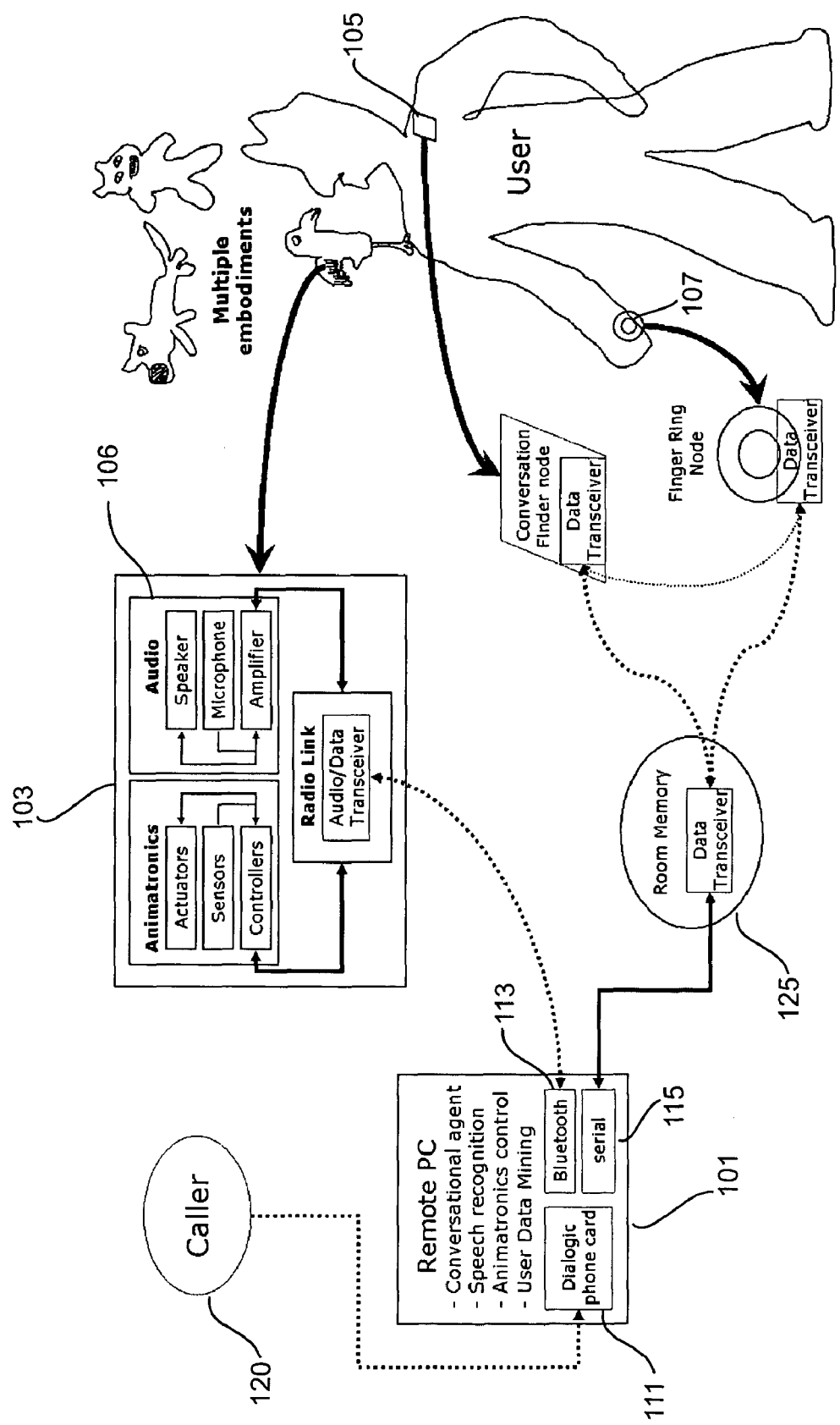
FIG. 1 is an architecture overview of an interactive autonomous intermediary system that embodies the invention.

The Intermediary consists of the following main subsystems as seen in FIG. 1:

(a) Remote computer seen at 101: located within range of audio and data transceiver; runs all high-level control processes; has a landline phone interface; runs speech recognition server; access to wireless data transceivers (for animatronics and sensor network)

(b) Animatronics 103: to be carried or worn by user; sensors and actuators controlled locally by microprocessors; wireless duplex audio and data link to PC for audio functionality (cellphone) and to relay actuator and sensor data (c) Conversation Finder nodes seen at 105: to be worn close to the neck; overall size less than 40 mm (d) Finger Ring nodes seen at 107: to be worn on finger System Components The remote PC seen at 101 that includes a telephone interface (a Dialogic card) seen at 111 that provides landline call control and a Bluetooth transceiver seen at 113 that provides an audio and data link with the animatronic unit 103, and a serial data transceiver 115 that communicates with the local sensors, including the Conversation Finder nodes 105 and the Finger Ring nodes 107.

The remote PC 101 executes programs including a conversational agent that interacts simultaneously with the caller (seen at 120) on a remote telephone, and the user via the animatronic unit 103. The remote PC includes a speech recognition system for interpreting user commands. The PC 101 further acts as an animatronics control server, sending commands to the animatronic unit 103 via the Bluetooth link, and as a sensor network bridge server for receiving sensor data vial the serial port 115.

The PC 101 may be further connected to other servers which can perform other functions of use to the system.

The PC 101 includes an animatronic control server which receives high level messages from a conversational agent and sends servo-command signals to one or more different animatronic units 103. As described later, the animatronic unit 103 may take a variety of forms, such as a parrot, squirrel or bunny. The overall size of the creatures is between 11 cm and 30 cm.

Actuated degrees of freedom of an animatronic unit 103 include eyes opening/closing (bunny, squirrel), looking up (bending neck back) or uncurling (from curled position to straight back), turning head, and wing movements (parrot). The animatronics control server software, running on a remote PC, receives high-level messages from the conversational agent and sends servo signals to the animatronic device 103 via Bluetooth wireless serial data link 113.

The Bluetooth transceiver provides a wireless duplex audio and data connection between the animatronics unit 103 and the PC 101. The animatronics unit includes an audio section 106 with a speaker (for sending voice and other audible prompts to the user) and a microphone for receiving voice responses and commands from the user. The PC 101 sends speech and audio prompts to the user via the animatronic unit, and receives and recognizes spoken responses from the user. The PC's audio input and output capabilities are thus extended to the user via the animatronic device, and to the remote caller via the phone hookup. The Bluetooth transceiver also provides a duplex data channel. Via this serial channel, the animatronics receives high-level servo control signals from the animatronics server, and simultaneously sends back the animatronics' unit's sensor data.

Animatronics Controllers

The animatronics unit includes two microcontrollers (PIC 16F84A): the first one reads the switches in the animal's extremities, and sends back the status of each switch via Bluetooth channel. The second controller receives the serial servo data from the Animatronics control server, and generates the pulse width modulated (PWM) signals for the actuator servos that cause the animatronic animal (parrot, squirrel or bunny) to move in characteristic ways.

There are three switches in the extremities of the animatronics. They are generally used as Yes, No, and Connect/Disconnect buttons, but their functionality varies slightly depending on the status of the animatronics. In earlier Intermediarys (bunny), there was an additional switch in the creature's ear, which was used as a push-to-talk button.

Conversation Finder nodes

The conversation finder nodes 105 worn at the neck of each user consists of two microcontrollers, a microphone and microphone preamplifier, a radio transceiver for exchanging data with the remote PC 101 and other nodes in proximity, and a battery.

Each user owns his or her Conversation Finder node, worn close to the neck. It functions as binary speech detector and communicates asynchronously with other nodes on a single radio channel. Each node sends out frequent heartbeat messages over RF, as well as specific messages when the user is talking, and receives messages from the nodes in proximity (approx. 10 meters). Each node independently comes to a decision about who is in the user's current conversation by looking at alignment and non-alignment of the speaking parties. At any time, the Intermediary can query the user's node wirelessly for this continuously updated list of people, as well as for other information concerning the user's conversational status.

Finger Ring nodes

The actuated ring 107 consists of a tiny vibration motor (pager motor with an eccentric weight), a 20 mAh lithium polymer battery, a micro switch, a Radiometrix Bim2 transceiver (433 MHz), and a 16F877 microcontroller. The Finger Ring's transceiver receives messages from its user's Conversation Finder node indicating when the ring is to vibrate. If the user touches the micro switch located under the ring, the transceiver broadcasts an anonymous veto message to the Intermediary.

Room Memory nodes

Room Memory nodes seen at 125 are implemented as virtual nodes in software, and use the sensor network base station with Radiometrix Bim2 transceivers.

System Communications

Figure 2:
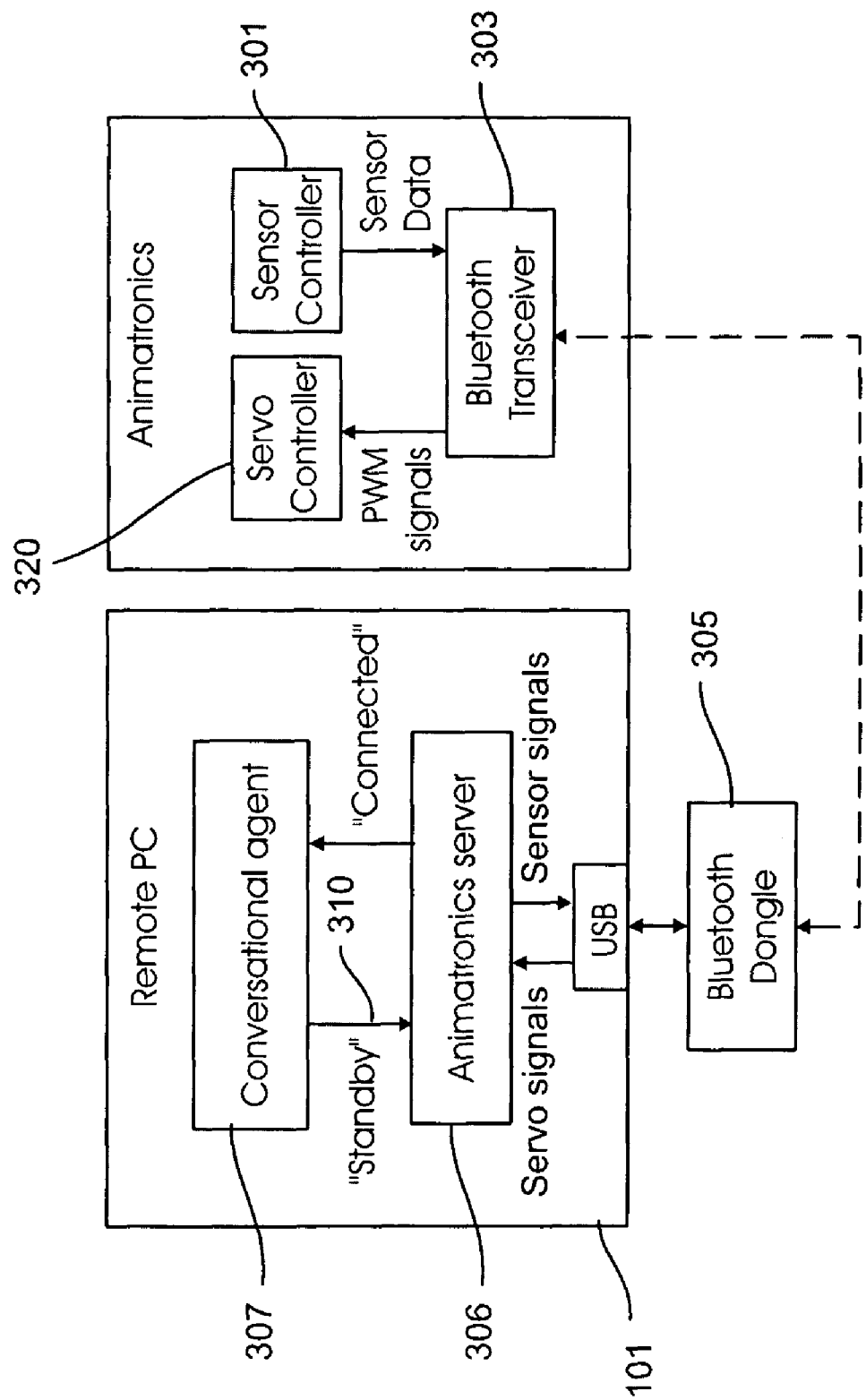
FIG. 2 is a block diagram illustrating the communication subsystem.

The main system components communicate with each other as described below. These communications take place in one of two system states (a) Upon system startup, and (b) Upon incoming call Upon system startup, several connections are established in sequence. As seen in FIG. 2, the sensor controller 301 on the animatronics goes through a sequence of serial commands to set the Bluetooth transceiver 303 into duplex audio and duplex data mode. The Bluetooth transceiver attempts a Master-Slave connection to the Bluetooth dongle 305 on the remote PC. After this sequence, the sensor controller 301 starts to read the positions of all switches and generates serial signals that it sends to the Bluetooth transceiver 303 which sends this data to the animatronics control server 306 via the wireless link. As soon as the animatronics server 306 reads sensor signals from the serial port, it sends a socket message to the conversational agent software 307 that a connection to the animatronics has been established. The conversational agent 307 receives this message, and sends back its first high-level command "System Stand by" as seen at 310.

The animatronics server 306 looks up the primitive behaviors associated with "System Stand by" and starts generating the basic PWM (pulse width modulation) serial signals for the servos via the Bluetooth data link to the Bluetooth transceiver 303 in the animatronic unit. The servo controller board seen at 320 reads these serial signals and generates continuous control signals for each servo. At this point, the system is up and running.

The communication protocols between the subsystems will be described in greater detail in later sections.

Upon Incoming Call

When the Intermediatry receives a phone call via the Dialogic board seen at 111 in FIG. 1, it first contacts the sensor network to establish the conversational setting of the user via the Conversation Finder nodes. In a second step, if necessary, it polls all conversational participants for their input via the Finger Ring nodes.

The following scenario illustrates the communication between conversational agent and the sensor nodes. Suppose three people, Albert, Ben and Claudia are in the same room. Albert is in a face-to-face conversation with Ben. While they are in the same room as Claudia, she is not part of their conversation. All three wear Conversation Finder nodes as well as Finger Ring nodes. Albert is holding his Intermediary, a squirrel, in his hand.

A fourth person, Dana, who is at a remote location, places a phone call to Albert which arrives at the Dialogic board of the PC. The conversational agent, running on the PC, registers the incoming call for Albert. The Conversational Agent running on the PC first determines Albert's conversational status by sending a message to Albert's conversation finder node 105 which is worn at Albert's neck, asking how many people are in his conversation, and how much he has been talking recently. Albert's node sends back the requested information.

Next, the Conversational agent on the PC agent polls the conversational partners of Albert by broadcasting a message to all Conversation Finder nodes in range: If the Conversation Finder of each person in range thinks that person is engaged in a conversation with Albert, those agents are asked to notify their users of the upcoming call! All three Conversation Finder nodes (Albert, Ben, Claudia) receive this message.

However, only the nodes of Ben and Albert think they are in a conversation with Albert. Claudia's node does not think so, since it registered her talking at the same time as Albert for several seconds. Ben and Albert's nodes accordingly send messages to their respective finger rings 107, causing them to vibrate briefly.

Ben notices the pre-alert, and thinks it is inappropriate to get an interruption right now, so he touches his ring slightly. The ring broadcasts an anonymous veto message, saying that it vetoes to the interruption by Albert's agent. Albert's conversational agent receives the veto, and takes it into account when deciding if it wants to interrupt Albert.

Conversational Agent

The previous section briefly explained the interaction of the conversational agent with the sensor nodes. This section will describe in detail the workings of the conversational agent.

From the perspective of the human user, the Intermediary consists of two types of 'agency':

(1) Conversational agent: for the owner and the calling party
(2) Embodied agent: for the owner and co-located people For a caller, the conversational agent may appear first as an ordinary answering machine or voice mail system: it picks up the call instead of the user. Indeed, the Intermediary makes conventional answering machines and voicemail obsolete and is perfectly able to 'emulate' such systems. However, the Intermediary transcends the capabilities of an answering machine in several ways. For example, it has the capability to mediate between caller and user in real time, being able to converse with both parties at the same time. It is also superior to a voicemail system because it takes into account the current conversational status of the user.

Call Tree

Figure 3:
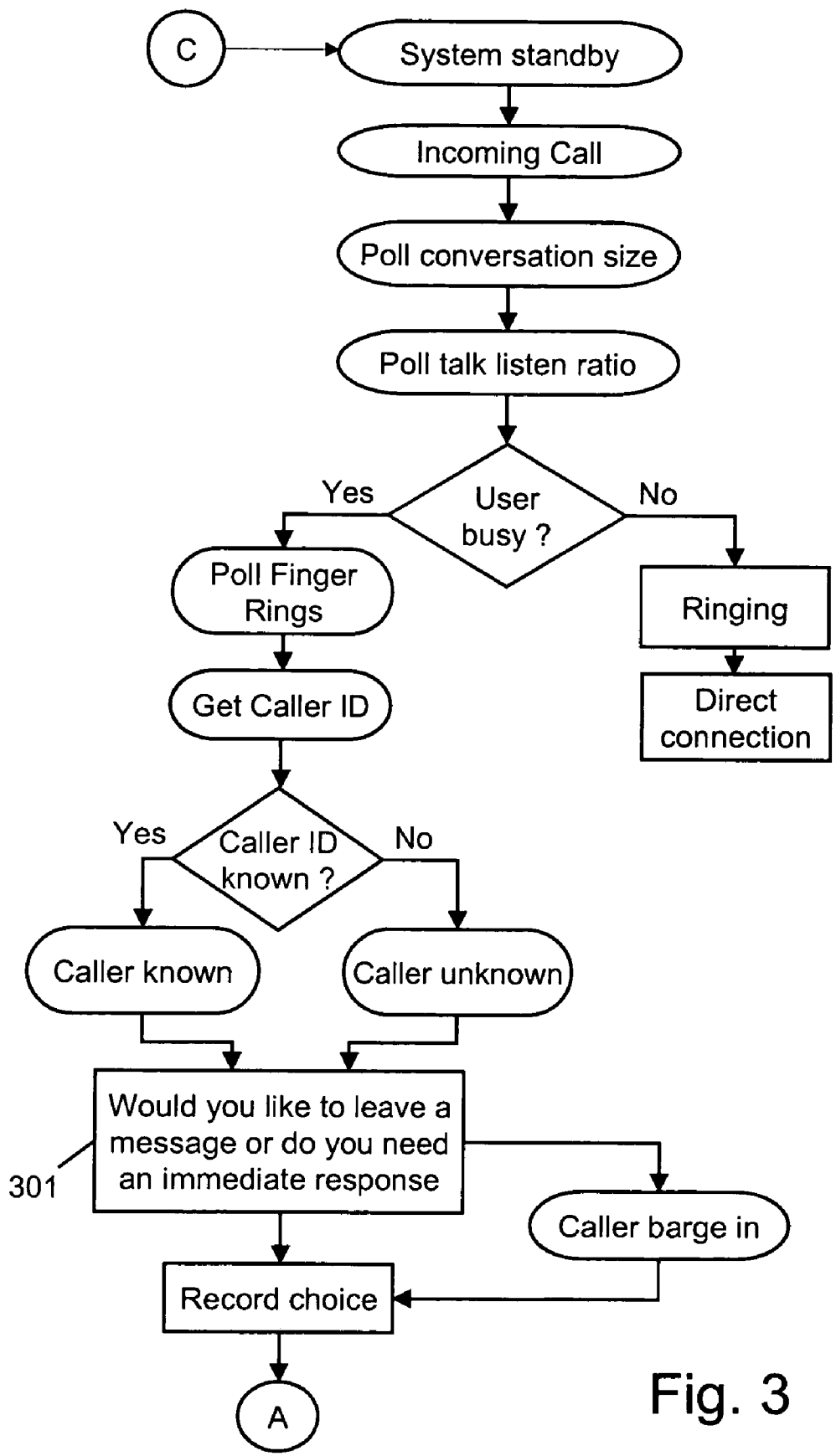
FIGS. 3-6 are flowcharts which illustrate the call tree processing employed by the conversational agent program.

The conversational agent, implemented as a finite state machine, follows a decision tree with branches that depend on external data and sensors, as well as caller and user choices detected via speech recognition and tactile feedback. The operation of the conversational agent is illustrated by the flowcharts, FIGS. 3-6. The following are the main factors influencing state changes:

a. Distinction between known and unknown callers via caller ID and a list of known caller
b. Caller and user choices: using speech recognition, both caller and user may choose between different modalities including voice mail and voice instant messages, or may choose to ignore the partner
c. Knowing if the recipient of the call is engaged in a conversation
d. Getting input from others in the co-located conversation
e. Knowing how other people in this location have responded to incoming calls As shown in FIG. 3, when a call comes in, the Intermediary first polls the user's conversational size and determines how often she spoke recently. If the user is in a conversation with somebody, or has talked for more than 25% during the last 15 minutes, the Intermediary assumes that the user is busy. If the user is not busy, however, the conversational agent plays a ringing tone and connects the caller directly to the user, which results in a full-duplex audio connection between caller and user.

Figure 4:
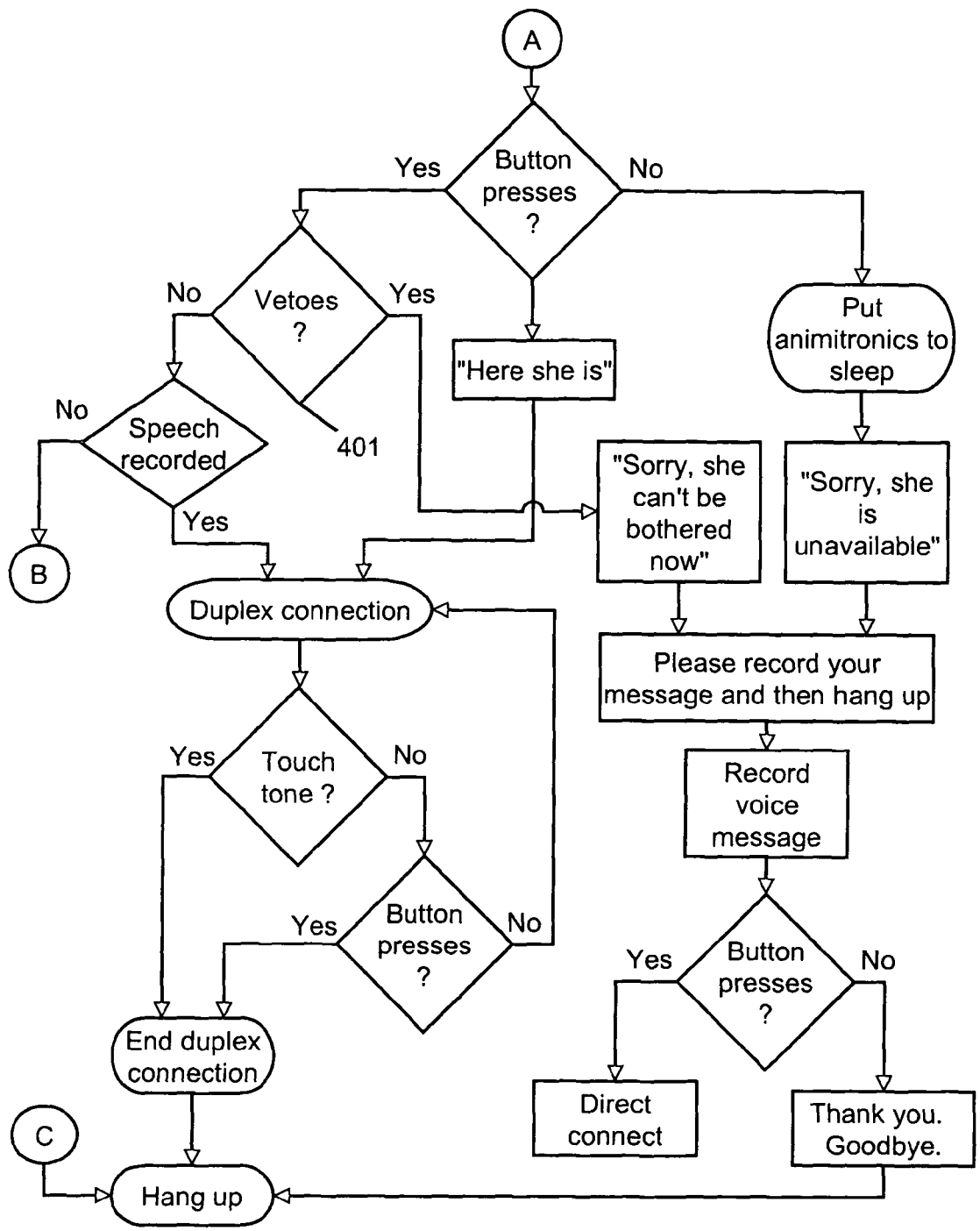

If the user is busy (as defined above), the Intermediary polls all participants of the co-located conversation by asking their conversation finder nodes to vibrate their finger ring nodes. All participants then have a 10-second window to anonymously veto the incoming call. As seen in FIG. 4 at 401, if any of the participants vetoes the incoming call, the caller is informed that the user cannot be reached.

During this window, the Intermediary keeps collecting information, such as caller ID, and compares the ID with a list of known people. Then the Intermediary greets the caller as indicated at 301, and asks the caller if she wants to leave a voicemail message, or needs an immediate response. If the caller chooses voicemail, the system records the message and terminates the call.

Figure 5:
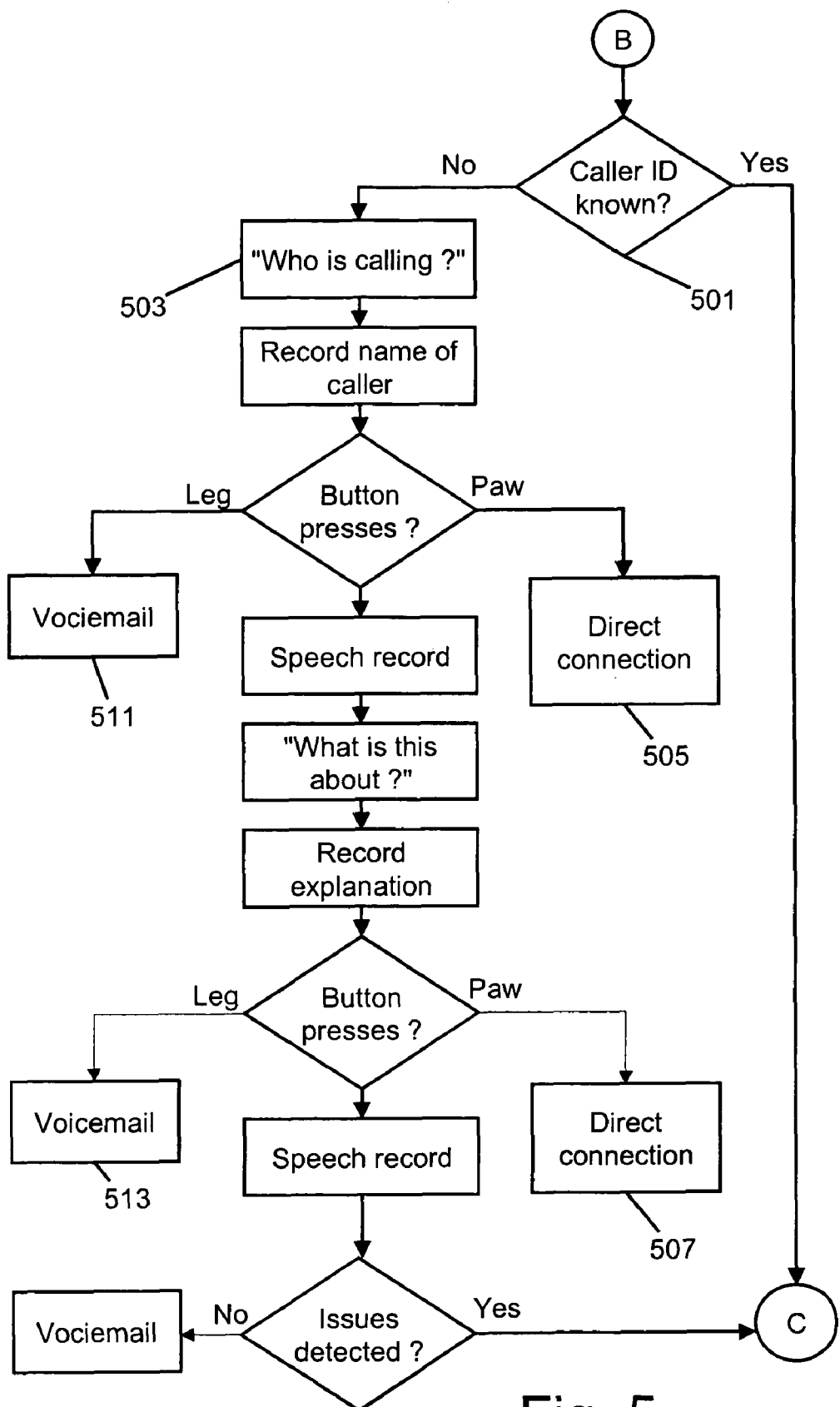
Figure 6:
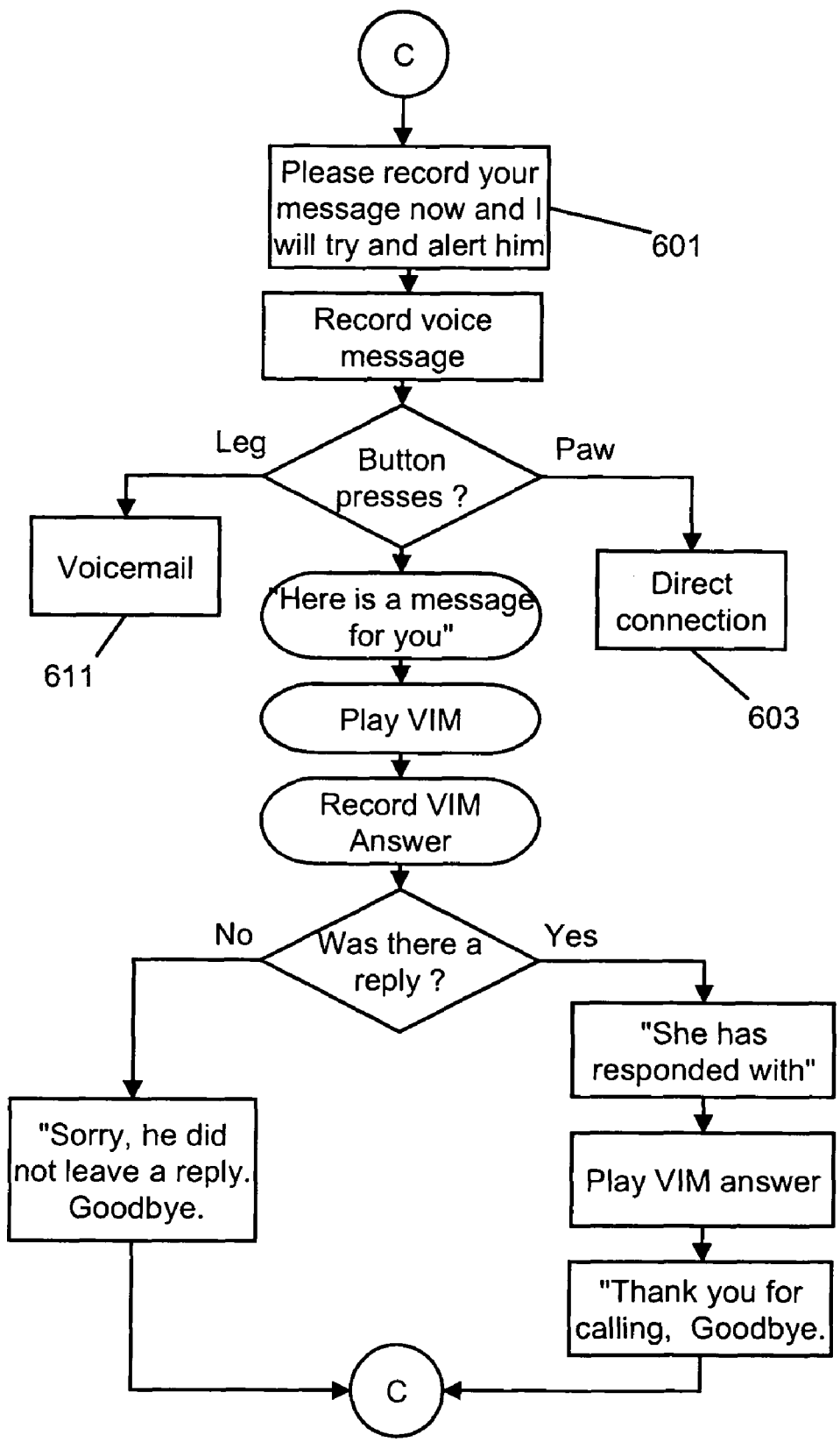

If the Intermediary recognizes the caller from caller ID as seen in FIG. 5 at 501, and the caller needs an immediate response, the Intermediary allows the caller to record the message as seen in FIG. 6 at 601, alerts the user, and plays back the message, waits for a reply, and plays back the reply to the user. However, if the caller is not known, the conversational agent asks the caller for more details about the call as seen at 503 in FIG. 5 and the caller's identity. The caller's answers are recorded and fed into the speech recognition engine, which is loaded with a specific vocabulary that tries to detect certain keywords that might be of interest to the user. The specific vocabulary may be compiled by processing data files on the user's computer, such as the user's outgoing email, the user's to-do list, or web searches recently conducted by the user. Stop words of little interest are removed from these text files, and a the most frequently used "uncommon" words which are indicative of the user's current interests are then compared with the text created by speech-to-text conversion from the incoming message. In this way, messages which may warrant the user's immediate attention may be identified.

If the caller mentions a certain amount of interesting keywords, the conversational agent moves on and lets the caller record a voice instant message, and follows the path described above.

At any point in the conversation, the user has the possibility to influence the caller's mode of communication by interacting with the animatronic device. If the user presses the front paw of the animatronic device, the caller gets connected directly to the user as seen at 505, 507, and 603 regardless of the caller's previous choices. If the user pressed the animatronics' back leg, the caller gets sent to voicemail immediately, regardless of the caller's choices, as illustrated at 511, 513 and 611. In each of these cases, a short prompt is played to explain the situation to the caller.

Similarly, if one of the co-located people vetoes to the call (within a 10-second window) as determined at 401, the caller gets sent directly to voicemail. There is thus a clear hierarchy among all involved parties in terms of communication mode changes. The hierarchy is as follows:

1. Owner of the Intermediary
2. Co-Located People
3. Caller

The conversational agent first checks the highest priority source, the owner of the Intermediary. The owner (user) can influence the call at any time by interacting with the animatronics. The user's choices are equivalent to "Connect the caller through!" (picks up the phone), and "Do not bother me now!" (unplugs the phone).

Below the user in the hierarchy are the co-located people. They can influence the call tree by vetoing. If the user does not express any preferences, the Intermediary checks if it has received valid vetoes from co-located people. If it did, any vetoes are received, the caller is sent to voicemail directly.

And finally, the conversational agent takes into account the preferences of the caller by evaluation the caller's language choices via speech recognition. Both the owner of the Intermediary, as well as vetoes from co-located people can override the caller's choices, however.

Although the caller has the lowest priority of all parties and can be 'overruled' by either co-located people or the Intermediary's owner, there is a safeguard built into the system for emergencies that allows the caller to make sure that her call still gets through. The conversational agent supports 'barge-in,' meaning, the caller can interrupt the agent's prompts at any time. If the caller does so, the currently playing prompt is halted and the conversational agent records the caller's words and sends the recording to the speech recognizer, looking for special 'emergency' keywords such as 'hospital,' 'accident,' and 'death' or words or phrases which are indicative of subjects of probable special interest to the user. If a matching word or phrase is identified, the caller is provided with a "barge in" connection to the called party (the Intermediary user).

Hardware

The remote PC (seen at 101 in FIGS. 1 and 2) may take the form of a conventional PC running the Windows® XP operating system.

The Dialogic phone card seen at 111 in FIG. 1 provides a communications port for long range communications via the telephone network, and allows programs executing on the PC 101 to receive and dial phone calls. The phone card may be implemented using an Intelo Dialogic® D/41JCT-LS PCI card which provides four-port, analog communications to support applications such as unified messaging, IVR (interactive voice response control), and contact centers. The D/41JCT-LS supports voice, fax, and software-based speech recognition processing in a single PCI slot, providing four analog telephone interface circuits for direct connection to analog loop start lines. In the illustrative arrangement described here, the Dialogic card utilizes only a single landline, but is built to serve up to four lines, each of which can receive incoming calls directed to a particular user via that user's Intermediary. Thus, a single remote PC may effectively operate as a PBX serving plural connected Intermediaries and their users which are coupled to the PC via a Bluetooth connection as seen in FIG. 2.

Software

Figure 7:
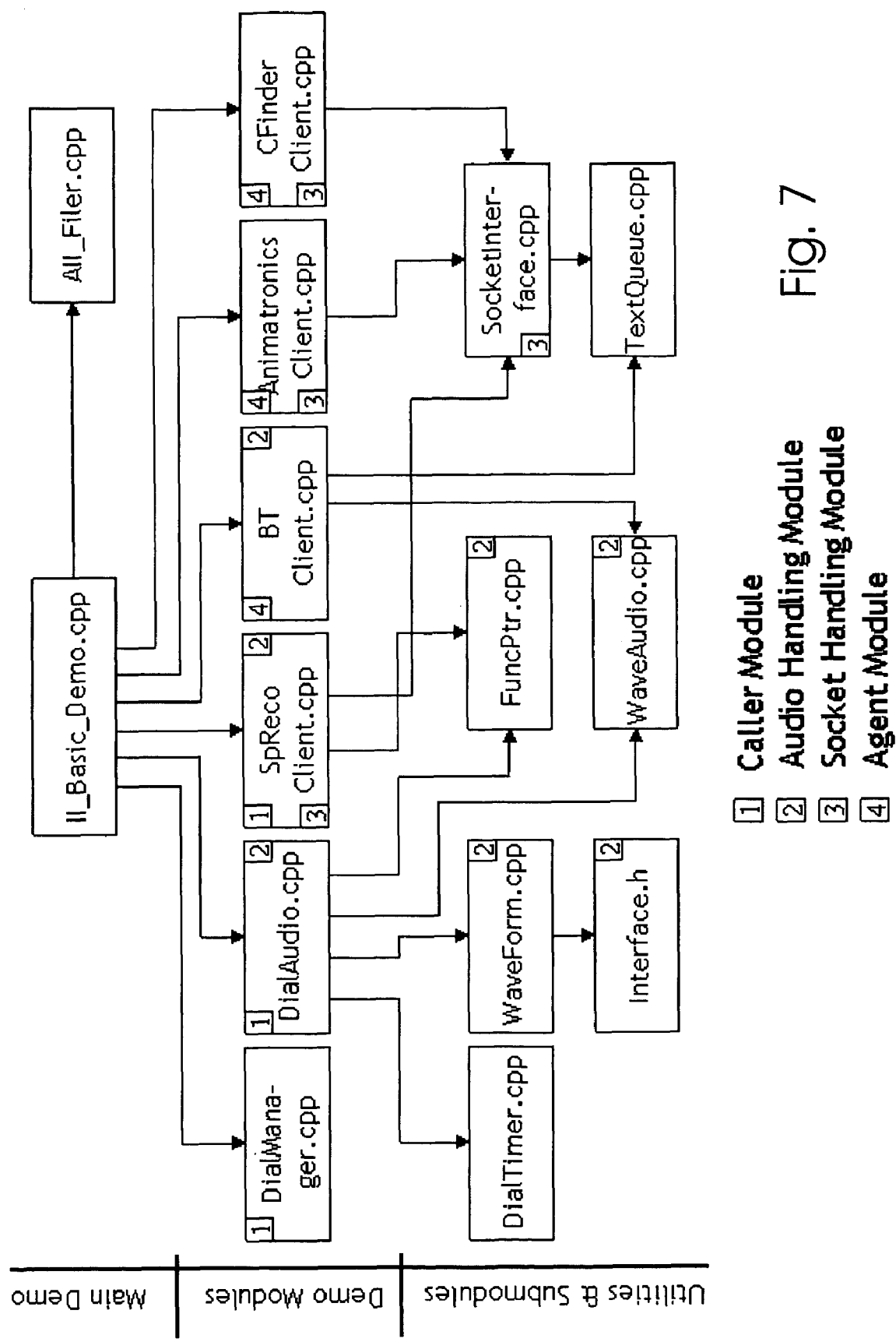
FIG. 7 is a diagram of the software architecture employed in the conversational agent program.

The conversational agent is written in C++ and a source language listing is provided in the accompanying computer program listing appendix. The program instantiates six main objects which shown in the object diagram seen in FIG. 7:

1) DialManager: manages the Dialogic phone card and its low-level hardware features such as line state detection, touch-tone detection, caller ID detection, etc.
2) DialAudio: handles audio playback and recording of the phone card; enables full-duplex conversations, pause detection, barge-in, etc.
3) SpReco Client: deals with the speech recognition server
4) BT_Client: handles audio to and from the animatronics (via Bluetooth)
5) Animatronics_Client: interacts with the animatronics server
6) Cfinder_Client: interacts with the sensor network hub, which allows communication between conversational agent and Conversation Finder and Finger Ring sensor nodes The code that allows for a duplex audio connection between caller (from the Dialogic card 111) and animatronics (via Bluetooth connection 113) employs a multiple buffering strategy to make sure the audio streams pass in both directions with minimal delay. A delay of 200 ms is acceptable without tying down the computer's processor too much, but still making sure that the delay does not disrupt the conversational partners.

The main modules rely on sub-modules, such as SocketInterface.cpp, which enables the multiple socket connections between the clients and servers, and WaveAudio.cpp that deals with all low-level audio functions, including a more convenient pause detection algorithm than the Dialogic's native one.

Since the agent's processes are multi-threaded, the software creates an extensive log file for later analysis, which includes saving all audio messages that have passed through the system, speech recognition results, etc.

The conversational agent relies on a speech recognition server based on Microsoft Speech, sending audio buffers and getting back the recognition results. It can dynamically change the recognizer's vocabulary, which is specified as an XML file. Both the audio that was sent as well as the speech recognition output is stored for each session.

Developing the Intermediary Embodiments

In accordance with a feature of the present invention, the call handling agents which provide the interface to users and others who are nearby takes the form of an animatronic robotic "animal" such as a squirrel, a parrot or a bunny. The embodied agent's primary function is to interact socially, with both the user and other co-located people. Humans are experts in social interaction, find social interaction enjoyable, and feel empowered and competent when a human-machine interface is based on the same social interaction paradigms that people commonly use. See Reeves, B., Nass, C. I. *The media equation: how people treat computers, televisions, and new media like real people and places*, Stanford, Calif. New York: CSLI Publications; Cambridge University Press (1996), Non-Verbal Cues for Interruption How do people interact with and interrupt each other? What kind of non-verbal cues are used? Non-verbal cues are communication signals without the use of verbal codes (words). Such cues can be both intentional and unintentional, and most speakers and listeners are not conscious of these signals. The cues include (but are not limited to): touch, glance, eye contact (gaze), volume, vocal nuance, proximity, gestures, facial expression, pause (silence), intonation, posture, and smell.

The problem is well studied for dyadic conversations with speakers and listeners taking turns. For example, the paper by Duncan, S., *On the structure of speaker-auditor interaction during speaking turns*, Language in Society 3: pp 161-180 (1974) shows that turn-taking behavior is a complex multistep process involving a strict pattern, which, if not followed properly, will result in simultaneous turn taking and confusion. There is a multitude of signals that are used to regulate this behavior. Of particular interest in this context are eye contact and gestures, e.g., a listener raising hand into gesture space as a nonverbal wanting-turn cue (e.g., see McFarlane, D. C., *Interruption of People in Human-Computer Interaction: A General Unifying Definition of Human Interruption and Taxonomy*, NRL Formal Report NRL/FR/5510-97-9870, Washington: U.S. Naval Research Laboratory (1997).

However, an Intermediary's task to interrupt is different from signaling turn taking in an ongoing conversation. It is rather comparable to an outside person trying to interrupt an ongoing face-to-face conversation. Experts for these kinds of interruptions are administrative assistants who are professional 'interruption mediators.' They make decisions every day about whether to allow interruptions to the person they support. See Dabbish, L. A., and Baker, R. S. *Administrative assistants as interruption mediators*, In Proceedings of ACM Conference on Human Factors in Computing Systems (CHI'03): Extended abstracts. New York: ACM Press, pp 1020-1021. http://doi.acm.org/10.1145/765891.766127 (2003) which, based on a series of interviews with administrative assistants, suggest a production-rule model of the decision process when deciding whether to deliver interruptions to the person they support.

Ideally, the Intermediary would learn the 'mechanics' of such behavior by imitating interactions between humans, perhaps starting with facial mimicry. See Breazeal, C., Fitzpatrick, P. *That Certain Look: Social Amplification of Animate Vision*, Proceedings of the AAAI Fall Symposium on Socially Intelligent Agents: The Human in the Loop, November 3-5, North Falmouth, Mass., Technical Report FS-00-04, pp 18-23, http://www.ai.mit.edu/people/paulfitz/pub/AAAIFS00.pdf (2000). Such a capability may well be a significant stepping-stone to developing appropriate social behavior, to predicting other's actions, and ultimately to understanding people as social beings. However, the present invention focuses on the use of human-style cues to alleviate the interruption problem.

In order for an agent to be understandable by humans, it must have a naturalistic embodiment and interact with its environment like living creatures do by sending out readable social cues that convey its internal state. See Zlatev, J, *The Epigenesis of Meaning in Human Beings and Possibly in Robots*, Lund University Cognitive Studies, vol. 79. http://www.lucs.lu.se/People/Jordan.Zlatev/Papers/Epigenesis.pdf (Zlatev, 1999). It is not implied that the Intermediary's software mimics mental cognitive processes. However, it is designed to express itself with human-style non-verbal cues such as gaze and gestures to generate certain effects and experiences with the user. The underlying idea is that human-style social cues can improve the affordances and usability of an agent system.

A conversational agent is given a physical presence, through interactive critters of different shapes and sizes, remotely controlled by a computer. These creatures interact by performing a combination of pet-like and human-like behaviors, such as waking up, waving for attention, or eye contact. These non-verbal cues are intuitive, and therefore may be ideal for unobtrusive interruptions from mobile communication devices. Physical activity of the embodied agent can alert the local others to the communication attempt, allowing the various parties to more gracefully negotiate boundaries between co-located and remote conversations, and forming "subtle but public" cues as described in Hansson, R., Ljungstrand, P., Redström, J. *Subtle and Public Notification Cues for Mobile Devices*, Proceedings of UbiComp 2001, Atlanta, Ga., USA. Hansson et al. (2001). Furthermore, these cues allow for more expressive alerting schemes by embedding additional contextual information into the alert. For example, the agent may try to get the user's attention with varying degrees of excitement, depending on the importance or timeliness of the interruption.

The animatronics are also 'socially evocative' as they rely on our tendency to anthropomorphize and capitalize on feelings evoked when we nurture, care, or are involved with our "creation." See Fong, T., Nourbakhsh, I., Dautenhahn, K. (2003). A Survey of Socially Interactive Robots. Robotics and Autonomous Systems, vol. 42(3-4), March 2003. http://www.ri.cmu.edu/pub_files/pub3/fong_terrence_w_2003_4/fong_terrence_w_2003_4.pdf.

The animatronic embodiment of the user agent serves as a social interface by employing human-like cues and communication metaphors. Its behavior is modeled at the interface level, so the current agent is not implemented with social cognition capabilities. Yet, it is 'socially embedded' since the agent is partially aware of human interaction paradigms. For example, with its capability to detect speech activity and conversational groupings in real-time, the agent may choose to interrupt the user only when there is no speech activity. See Marti, S., Schmandt, C. *Giving the Caller the Finger: Collaborative Responsibility for Cellphone Interruptions*, Extended Abstracts of CHI2005, pp 1633-1636. (2005), http://doi.acm.org/10.1145/1056808.1056984

These animatronic user agents are zoomorphic, but employ anthropomorphic behaviors (gaze, gestures). Although this combination partially violates the 'life-likeness' of the creatures, it helps to avoid the 'uncanny valley,' an effect where a near-perfect portrayal of a living thing becomes highly disturbing because of slight behavioral and appearance imperfections.

Embodying an agent grounds it in our own reality. The structural coupling between system and agent creates a potential for "mutual perturbation." See Dautenhahn, K., *Embodiment and Interaction in Socially Intelligent Life-Like Agents*. In C. L. Nehaniv (ed.) Computation for Metaphors, Analogy and Agent, Springer Lecture Notes in Artificial Intelligence, Volume 1562, New York, N.Y.: Springer, pp 102-142. (1999). http://www.springeerlink.com/link.asp?id=9m9h2e7ejahq42ur.

In the current system, the user agent is realized on two levels. First, the degrees of freedom of our animatronics allow the system to 'perturb' its environment via physical movements. Second, the dual conversational capability that enables the system to engage in spoken interactions with both user and caller, allows the agent to communicate in the conversational domain, which is equally human accessible. On both levels, the agent can manifest its internal state towards its environment (the caller, the user, and co-located people), and get input from its environment (spoken language, tactile) via its sensors and actuators. For example, the Intermediary changes its movements when there is an incoming call, further differentiating between known and unknown callers using non-verbal signals to 'act out' what is going on in the phone domain.

The current Intermediarys are all based on animals (bunny, squirrel, and parrot), but their respective morphologies are diverse enough so that their appearances create different expectations (and preferences, as user studies show). These expectations influence the behaviors that the user might want to see from the animatronics. Due to the layered software architecture, the same conversational agent can control any of our Intermediarys, without modifications of the state machine. A diversity of Intermediarys is fully intended, since users may have strong individual preferences for their personal animatronics.

Although the main function of the Intermediary's animatronic device is enhancing communication and alerting, is unlike any conventional stationset equipment, and certainly not just like a cellphone. Rather, the Intermediary should be regarded as a 'sentient companion' (although not in the literal sense) that keeps the user's company, much like a pet dog or another small, tamed creature. Such a view suggests some of the ways an Intermediary could be embodied; that is, suggests what it should look like and how it should behave. Since the animatronics part of the Intermediary is a personal companion to the user, the metaphors of a pet like companion has been employed.

Pirate with Parrot

One famous pet-like companion is the parrot sitting on the mystical sailor's shoulder. Another one is the snake wound around the handler's neck. Some metaphors are more contemporary, like a small rodent 'living' in the shoulder/neck area of a punk rocker. The last two mentioned, however, do not guarantee wide public acceptance, because of the ambivalent connotation of snakes and rats.

However, there are more ways an Intermediary can be embodied, keeping in mind that one of the most important reasons to embody the Intermediary is to provide a natural and clear focal point of attention for the people around the user. In other words: it has to be clearly visible to the people around the user. One such Intermediary could be a hamster (or similar sized creature) sitting in the user's chest pocket. This location is highly visible to the people around the user, and includes the important option of looking up to the user.

As mentioned earlier, another important reason to embody the Intermediary is to use socially intuitive cues to interrupt and alert, instead of ringing or vibration. One of the strongest social cues is gaze. Therefore, it is important that an Intermediary can look at people, and at the user specifically, with big eyes. As a contrast, the Intermediary could be asleep when not in use. This can include slight breathing movements to make it still appear 'alive' (in a wider sense).

In general, the most generic mapping between the animatronics behaviors and meaning is as follows:

| Behavior | Meaning |
| --- | --- |
| Sleeping, breathing | Idle, nothing important going on |
| Waking up, looking around, seeking eye contact | Get attention from user and co-located people |

In the following description, four different generic types of Intermediarys are presented that differ in their respective functional advantages and disadvantages. Three Intermediarys are described in detail.

Creature Resting on Shoulder

Figure 8:
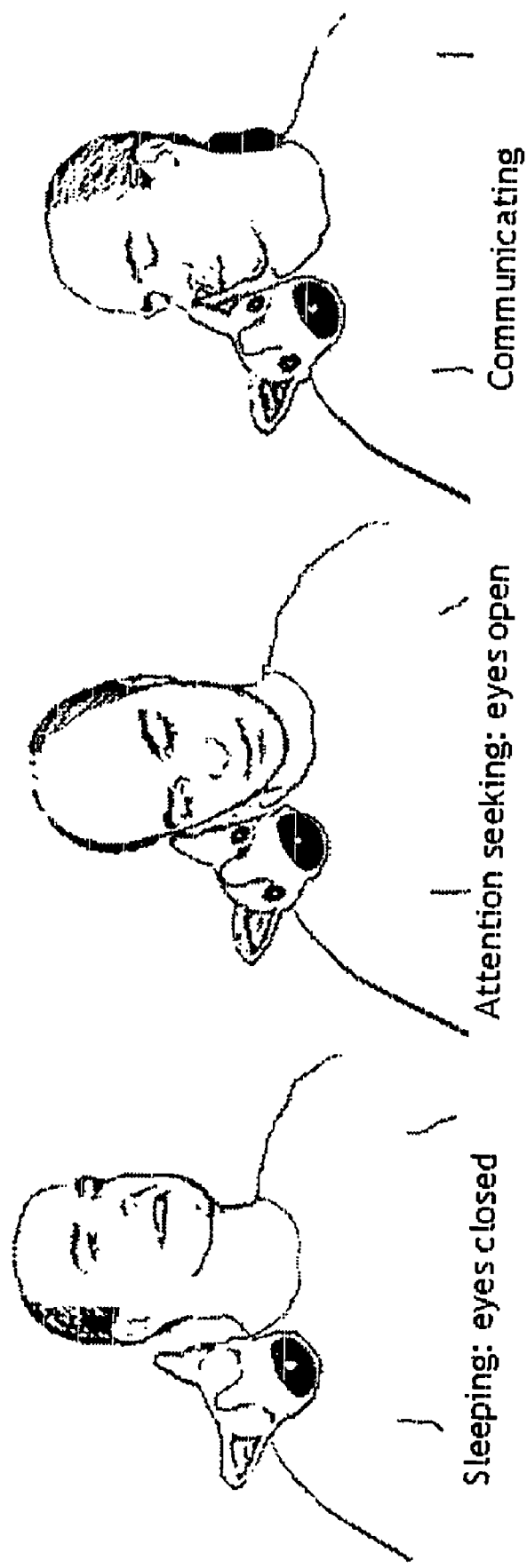
FIG. 8 illustrates the behavior of an on-the-shoulder animatronic animal that acts as user agent.

A user agent that takes the form of a creature resting on the user's shoulder is seen in FIG. 8.

| Features: | Opens and closes its big eyes; touch sensitive nose and ears |
| --- | --- |
| Advantages: | Good visibility to other people; rests easily on shoulder |
| Disadvantages: | Only one degree of freedom (only its eyes are animated) |

Although having a creature resting on a user's shoulder as illustrated in FIG. 8 is highly visible to co-located people (which is the desired effect), the user himself can't see the eyes of the creature if its head is not turning. Therefore, opening its eyes could be accompanied by a very low volume sound, only audible to the user. Such a sound would also mask the sound of the actuators, if they were based on motors and gears. (The masking issue disappears if quiet actuators are used, such as magnetic actuators or actuators based on shape memory alloys.) This instantiation is based on a 'lazy animal' resting its (oversized) head on the user's shoulder. It has an extremely oversized nose and head section. The animal has big eyes, which grab attention by just opening its eyes. In addition to that, the animal incorporates all features that seem to influence the 'cuteness' of a creature: big eyes, high forehead, big head compared to body, short arms and legs. Cuteness may be important to increase the social acceptance of an Intermediary. In addition, it is often associated with young creatures, like puppies, which are given more freedom in case of misbehavior, since the creature is still in its infancy, and just doesn't know any better. Therefore, people are more forgiving with interruptions from creatures obviously still "in training."

Bird Standing on Shoulder

Figure 9:
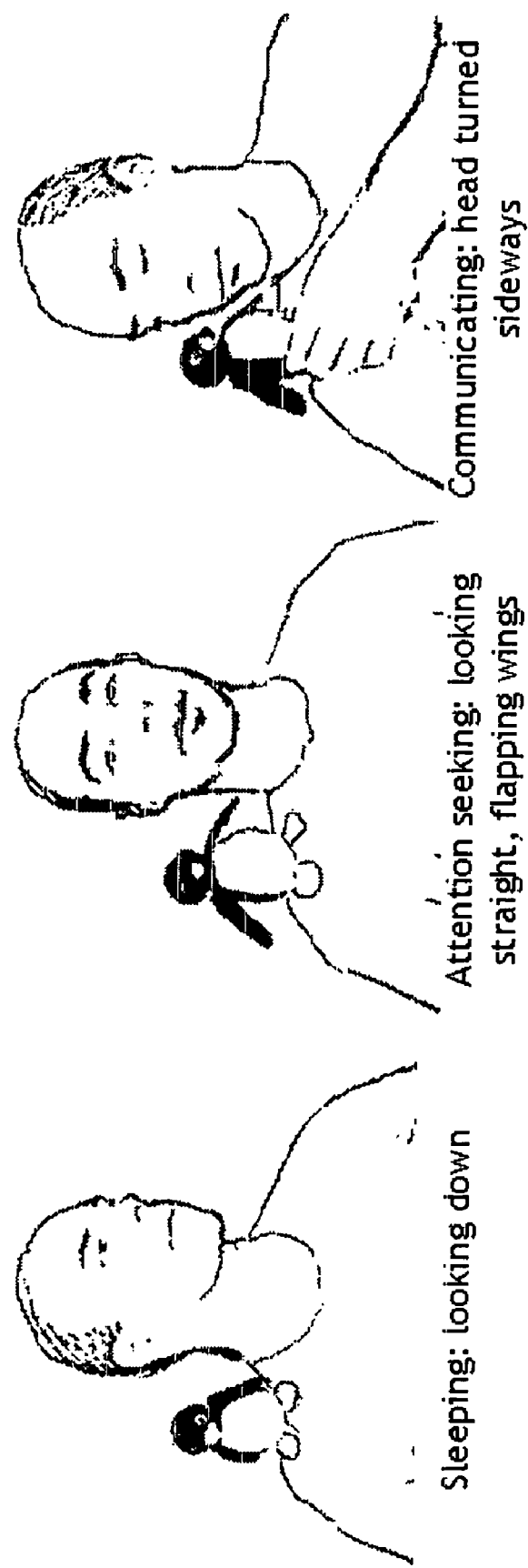
FIG. 9 illustrates the behavior of an on-the-shoulder upright animatronic bird that acts as user agent.

A second Intermediary, a bird on the user's shoulder, is illustrated in FIG. 9.

| Features: | Moving head up/down, or eyes opening/closing; wings flapping; touch sensitive wings; head turning towards user |
| --- | --- |
| Advantages: | Very good visibility on shoulder, can talk directly into user's ear |
| Disadvantage: | Difficult to mount/balance on shoulder |

Although balancing a bird on one's shoulders is non-trivial, sitting on the user's shoulders has the obvious advantage of being very close to the user's mouth as well as one of his ears. Because the microphone is close to the user's mouth, his voice is picked up well even if talking in a low volume; and because the speaker is close to the user's ear, especially when the user turns towards the Intermediary, playback volume can be very low and still acceptable for the user.

Creature in Chest Pocket

Figure 10:
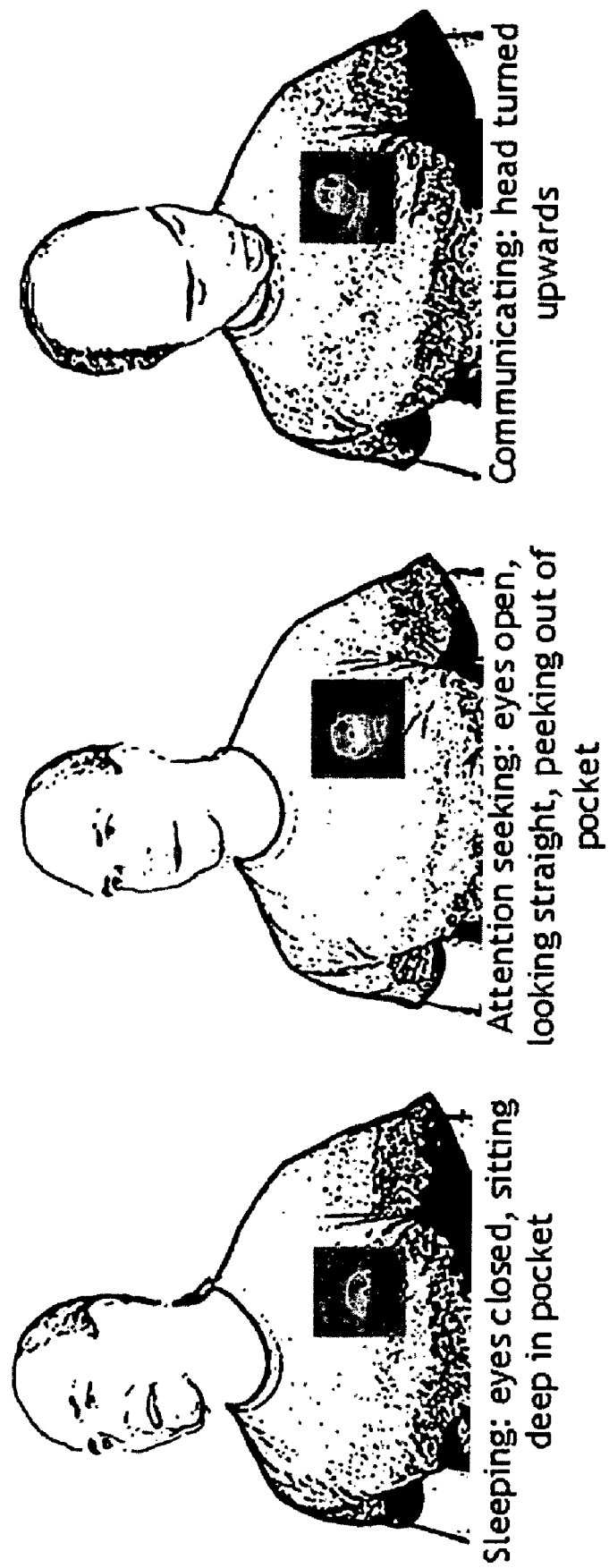
FIG. 10 illustrates the behavior of an in-the-vest-pocket animatronic animal that acts as user agent.
Figure 11:
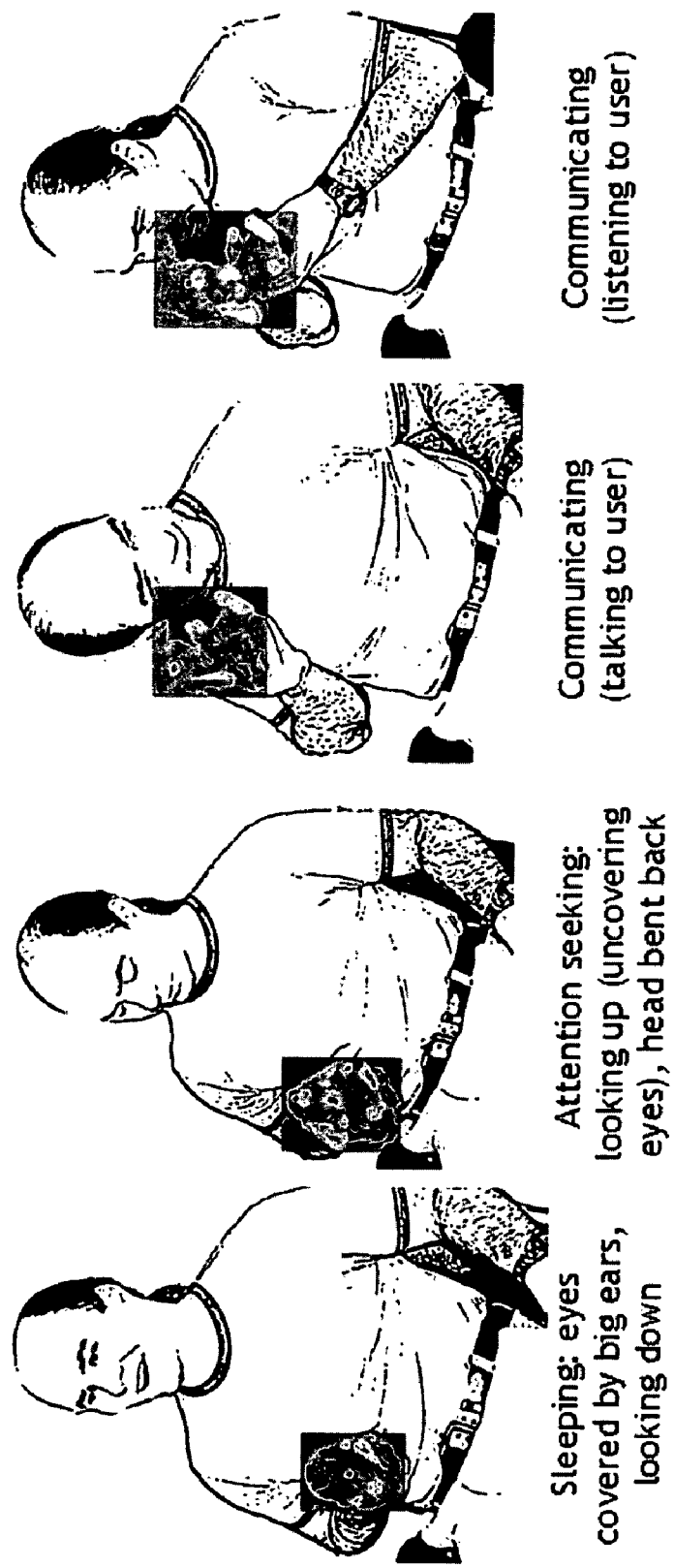
FIG. 11 illustrates the behavior of a hand-held or on-a-table animatronic bunny that acts as user agent.

A third Intermediary, a creature in the user's chest pocket, is illustrated in FIG. 10.

| Features: | Moves in and out of chest pocket (vertically), turns upwards towards user |
| --- | --- |
| Advantages: | Convenient to carry; small |
| Disadvantages: | Difficult to integrate all elements into a chest pocket sized animal; not as visible as the other instantiations |

This instantiation is inspired by a hamster that sits in the user's shirt pocket, usually asleep, but wakes up when it has to alert, peeks out and looks up to the user when it wants his attention. A possible version would be a Beanie Baby® sized doll, or a custom made stuffed animal Creature in Hand and on Table A third Intermediary, a creature in the user's hand or on a table, is illustrated in FIG. 10.

| Features: | Moving head up/down (big ears covering eyes); touch sensitive ears |
| --- | --- |
| Advantages: | Doesn't have to be worn, can sit on desk by itself |
| Disadvantages: | Has to be carried around |

As mentioned above, making the creature appear cute is important to increase its social acceptance for co-located people. This creature in the hand or on a table profits from the very cute movement of a small rabbit baby being curled in during sleep, almost spherical in shape, and then stretching its back when waking up. When asleep, its eyes are covered by its floppy ears, but are uncovered in a very cute way when waking up. This is a typical example of a "cute" movement, which can be as important as "cute" static features. Such movements are slow, never abrupt or fast, and may exhibit non-linear acceleration and deceleration to more realistically mimic such "cute" movements.

Since cuteness does not have to coincide with 'life-likeness,' it is possible to explore non-lifelike entities as Intermediaries that become attractive and socially acceptable through their mere movements. The movement of "unfolding" seems a promising candidate. A good example it the so-called robotic calculator that unfolds and stands up, which is an amazingly cute feature since the spring is damped heavily to allow for a very smooth and slow unfolding process. Another possibly cute movement could be a creature coming out of its nest or 'house', like a hermit crab or a turtle peeking out of its shell.

Other possible locations for the Intermediary include:
1) Hanging in front of chest, with necklace
2) Wrapped around neck, as a scarf (octopus, snake)
3) Wrapped around upper or lower arm
4) On user's back or over shoulder: e.g., a monkey disguised as a backpack or shoulder bag. Advantage: enough space for adding sub-systems; can "hold" or "hug" the user naturally Disadvantage: much larger than cellphone
5) Finger mounted, fingertip mounted (thimble), thumb nail mounted. Disadvantage: difficult to incorporate all necessary subsystems on such a small form factor.

Other possible degrees of freedom for the Intermediary may include:
a) Opening/closing pupils (making big eyes)
b) Tilting head sideways (may increase perceived cuteness)
c) Wiggling ears or tail
d) Raising eyebrows
e) Crawling up and down the user's sleeve (attached to lower arm)
f) Shrinking shoulders
g) Waiving with paws (if sitting in chest pocket)
h) Nose movement (sniffing, like Ocha-Ken™)
i) Slightly breathing (chest movements)
j) Blowing up cheeks (like hamster)
k) Moving and glowing up whiskers
l) Rattling (snake)
m) Moving eyes on eyestalks Clearly there is a design and fashion aspect to an Intermediary. Cellphones are becoming fashion statements, a trend that will soon become the main reason to buy new communication devices. Although it will be very difficult to keep up with the quickly changing fashion trends, there are things that would increase the acceptance of an Intermediary to fashion conscious users, e.g., can if it can be worn in more than one location.

Animatronics

The following section describes different Intermediary embodiments. These embodiments include "stuffed animals" that were heavily "enhanced" so that each contained some or all of the following subsystems:
A. Actuators and sensors
B. Wireless transceiver (i.e., Bluetooth for duplex audio and data)
C. Audio (audio amplifier, speaker, microphone)
D. Animatronics control (converting actuator and sensor signals)
E. Batteries and power conditioning
F. Skeleton and skin Three generations of animatronics were employed in a parrot, a bunny and a squirrel. Each has different capabilities, for example, different degrees of freedom and different audio/data links.

Actuation

The parrot has four degrees of freedom: two for the neck (up-down, left-right), and both wings separately. This allows the bird to look up, look around, express different patterns of excitement and frustration with its wings, etc.

Both bunny and squirrel have also four DOF: two for the neck and spine, and both eyelids. The initial posture is curled up; they wake up with an 'unfolding' movement. They then can look around, and together with fine eyelid control express surprise, sleepiness, excitement, etc.

In order to create a realistic eye opening and closing expression, both bunny and squirrel are able to move both upper and lower lids, using small rubber bands as lids that are pulled back simultaneously by a micro servo via thin threads.

All actuators are independent channels that are fully proportional with a resolution of 100 steps from one extreme to the other.

The animatronics do not try to express emotions per se. Since they mainly use gestures and gaze, they do not employ complex facial expressions other than moving eyelids, and have no need for mobility (i.e., no walking).

Wireless Link

Although the animatronics may be controlled directly by the user's cellphone, or the animatronics will contain the cellphone, the animatronics devices described here are implemented with a 'remote brain' approach; that is, they are computer-remote controlled, but completely wireless and self-contained devices.

The three generations of Intermediaries differ in their wireless links: the parrot has a simplex data link and no audio capabilities. The bunny sports a simplex data link as well as half-duplex audio. And the final generation, the squirrel, has both full duplex audio and data link.

The parrot and the bunny are controlled via radio control ("R/C") gear that is used by hobbyists to control airplanes and boats. This channel is simplex, with a range up to 100 meters indoors. The most advanced Intermediary, the squirrel, sports a fully digital link for both audio and data. On the desktop computer side, a Bluetooth class 1 transceiver is used with modified antenna to achieve a range of 40 meters indoors. On the animatronic Intermediary side, a Bluetooth class 1 module with a ceramic antenna is used. This Bluetooth link allows simultaneous duplex audio and duplex data transmission, and replaces the bulky R/C transmitter and half-duplex radio of our earlier prototypes. The duplex audio capability enables not only asynchronous voice instant messages between caller and user, but also a full duplex phone conversation. The duplex data channel allows sending back sensor data from the Intermediary to the animatronics control software.

A variety of conventional techniques may be used to control the movement of an animatronic creature in order to implement the present invention.

For example, U.S. Pat. No. 6,012,961 issued on Jan. 11, 2000 to H. D. Sharpe et al., the disclosure of which is incorporated herein by reference, describes an electronic toy that includes a user reprogrammable data storage device, such as recordable tape media, or digital memory, whereby a user can selectively download program information into the data storage device to change the independent operating characteristics of the toy. The program information is generated by a personal computer. The disclosed toy consists of an animatronic teddy bear having a reprogrammable digital memory. The program information, which may include audio data for speech and control data for movement of animatronic body parts under the control of servomechanisms, with the movements being synchronized with the toys audio output. The toy can be operated directly from output generated in real-time by the computer while connected to the computer, or by remote computer connected to the local personal computer.

U.S. Pat. No. 6,230,078 issued on May 8, 2001 to John D. Ruff, the disclosure of which is incorporated herein by reference, describes a simplified animatronic system using a computer to control the speed and direction of multiple stepper motors, so that a script for a sequence of operations of the motors can be prepared and edited, stored on disk, and played back to control the motors to control the motors to perform the sequence of operations. Each letter of the alphabet can identify a different motor speed, and each line of the script contains one letter for each motor being controlled.

The specific embodiments of the invention having the characteristics needed to act as an intermediary between calling parties and called parties and nearby people included a parrot that sat on the shoulder of the user and that moved in four degrees, of freedom: two for the neck (up-down, left-right), and both wings separately. This allows the bird to look up, look around, and express different patterns of excitement and frustration with its wings. The neck consists of a servo that can turn the head sideways. This servo is attached to the spine with a 'nodding' joint. A second servo moves the whole first servo forward and backward (nodding motion) via pushrod and clevises. The wing servos are attached on the side of the spine, and a square plastic tube extends the servo horns into the wings so that they can be moved on command.

The Bunny, chosen specifically for its cuteness, but also because of its size, fits perfectly into a hand, but has enough space inside to accommodate all electronics and mechanics. As a stuffed animal, its basic posture is curled up, almost spherical in shape. In this position, the floppy ears tend to cover the eyes. If the bunny raises its head, the ears uncover the eyes. The bunny's neck consists of two servos (Cirrus CS-6.2) connected head to head with an angular offset of 90 degrees. This neck construction allows the bunny to look left and right with a 90-degree angle, and independently raise its head with about the same angle. Instead of actuating the paws, it was decided to make the eyes open and close. Two micro servos (Cirrus CS-4.4) that fit in the bunny's head move the upper and lower eye lids using small rubber bands. The lids are pulled back by the micro servo via thin threads, providing a very life-like movement of the eyelids. On the bunny side, a transceiver accepted commands from an external push-to-talk button (momentary switch) in the right ear of the bunny, allowing the user to grab the bunny's ear when she wants to talk ("squeeze-ear-to-talk" metaphor). An additional momentary switch hidden in the right foot of the bunny allowed the user to turn on and off the transceiver without opening the animatronics. Whenever the user squeezes the talk button by squeezing the ear of the bunny, and then releases this button, a short noise burst is produced that is interpreted as positive confirmation signal (or another kind of signal depending on the context), allowing the user to signal the main agent software as needed.

Figure 12:
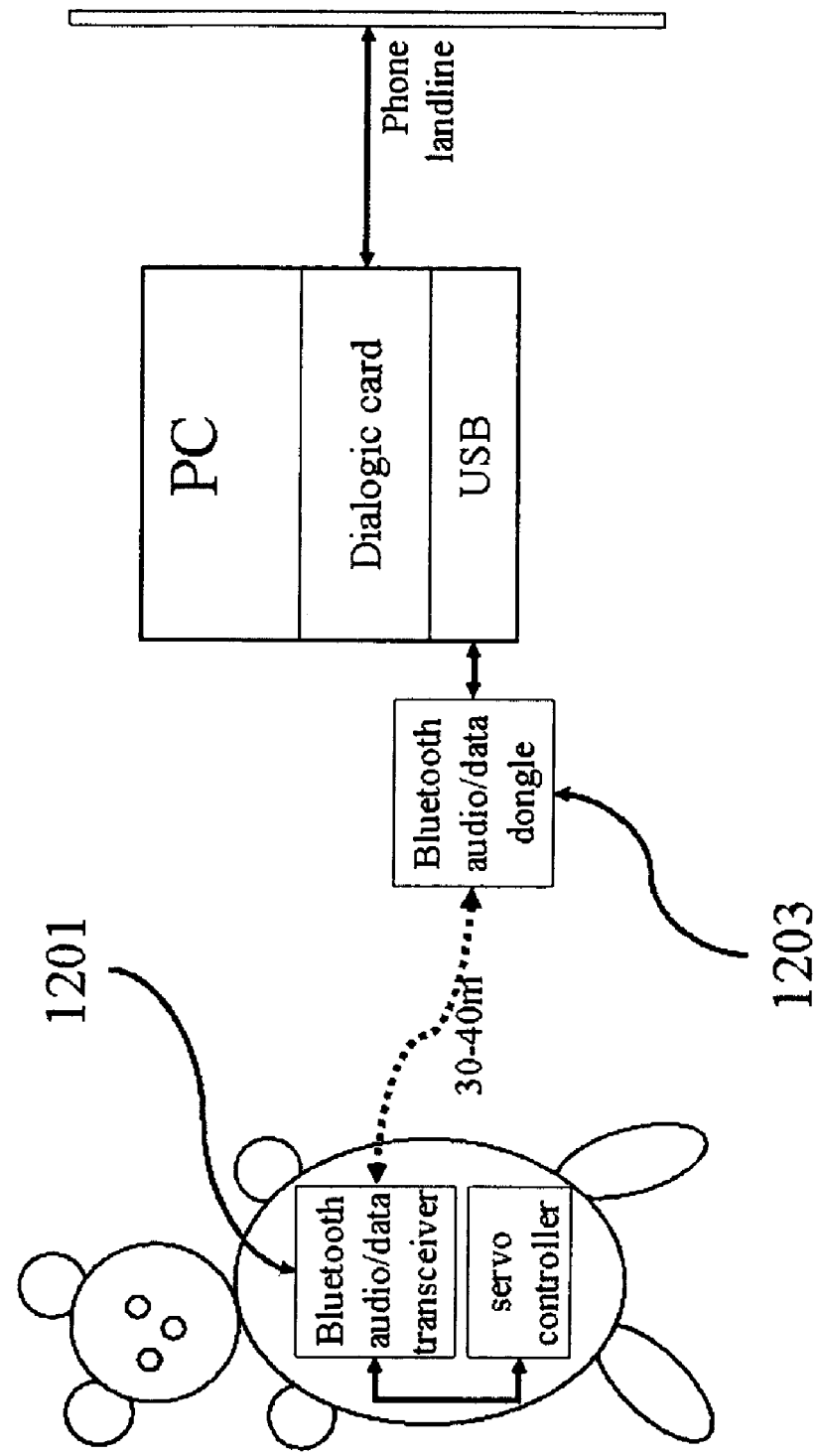
FIG. 12 is a diagram depicting the Bluetooth® communications pathway used to couple a PC to an animatronic squirrel.

The squirrel is the most advanced animatronics implementation of the three generations with its Bluetooth duplex audio and data connection. The mechanics of the squirrel are the same as in the bunny, and it uses the same skeleton and servos, but the communications take place over the Bluetooth link as illustrated in FIG. 12. The Bluetooth transceiver indicated at 1201 permits the squirrel to be up to 30 to 40 meters from the PC which sends audio and servo command data to squirrel (and hence to the user and those near the user), and transmits user signals back to the PC. On the desktop computer side, a Bluetooth class 1 transceiver (Linksysc USBBT100) seen at 1203 is used with modified antenna (2.4 GHz Range Extender) to achieve a range of 40 meters indoors.

On the Intermediary side, a Bluetooth class 1 module with a ceramic antenna is used. This Bluetooth link 1201 allows simultaneous duplex audio and duplex data transmission, and replaces the bulky R/C transmitter and half-duplex radio of our earlier prototypes. The duplex audio capability enables to not only pass asynchronous voice instant messages between caller and user, but also switch to a full duplex phone conversation. The duplex data channel allows sending back sensor data from the Intermediary to the animatronics control software.

Figure 13:
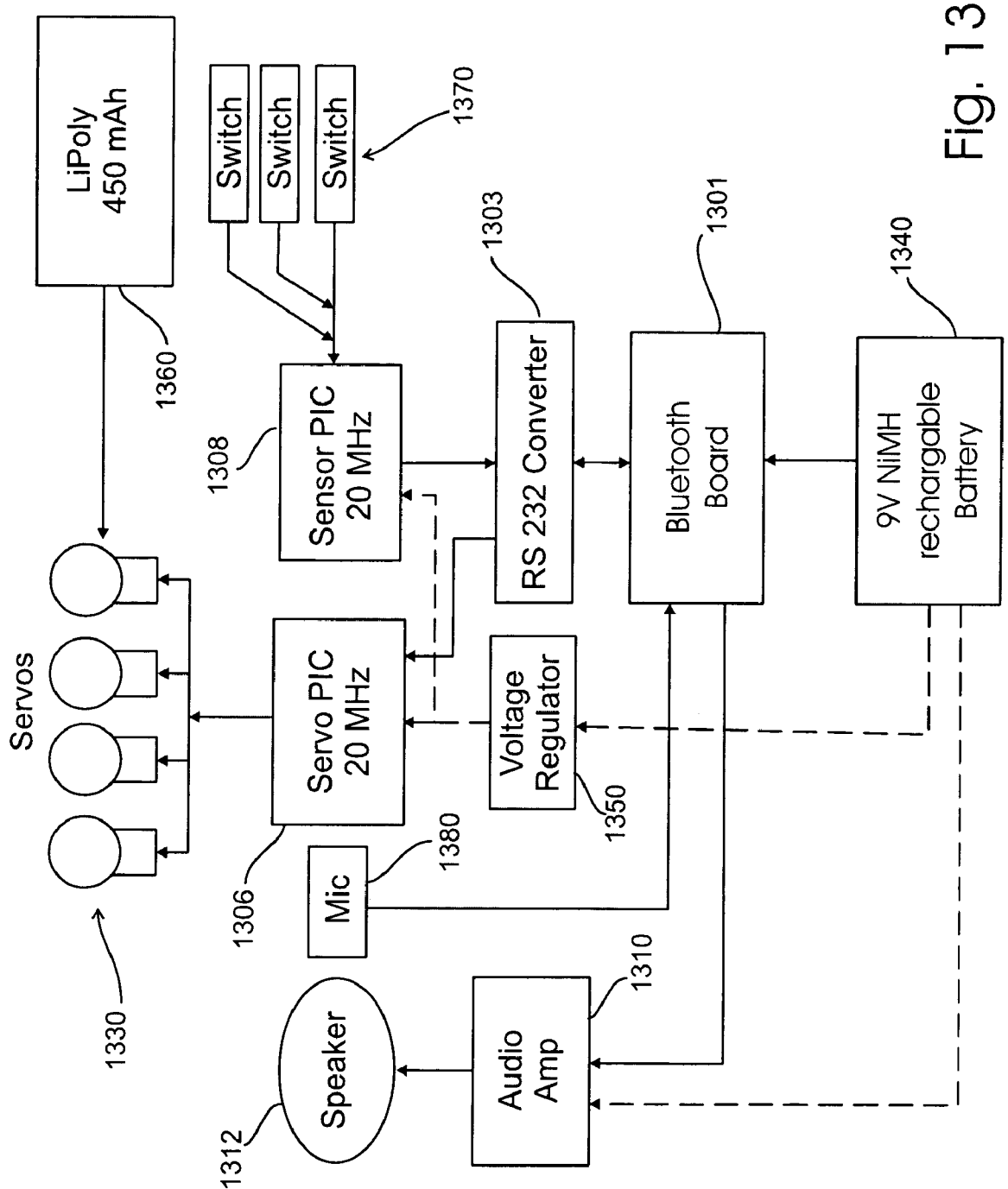
FIG. 13 is a block diagram of the principal hardware components mounted within the animatronic squirrel.

FIG. 13 illustrates the hardware components used to implement the squirrel. A Bluetooth board seen at 1301 includes an onboard audio codec and RS232 UART seen at 1303. Two PIC microcontrollers (16F87A), one each for the servo control and one for the sensor control are employed as seen at 1306 and 1308 respectively. An audio amplifier (1 watt) seen at 1310 delivers amplified audio signals to drive a speaker 1312 which delivers audible sound to the user and to those nearby. Four servo motors indicated at 1330 are controlled by the Servo PIC microcontroller 1306 to move the squirrel's head and eyelids as described above for the bunny. A 9V NiMH rechargeable battery seen at 1340 powers the Bluetooth board 1301 and the microprocessors 1306 and 1308 via a voltage regulator seen at 1350. A 3.7 V lithium polymer battery 1360 powers the servos 1330.

Since the squirrel has four degrees of freedom, two for the neck and spine, and two for the two eyelids, the four servos at 1330 can be driven to make the squirrel wake up with an 'unfolding' movement, and look around. These movements, couple with fine eyelid control. can be used to express surprise, sleepiness, excitement, etc.

The Bluetooth board 1301 is a commercially available board (a BlueRadios© BR-EC11A) made for evaluating Bluetooth modules, and comes with a codec, connectors for microphone and line out, UART and RS232 connectors, programmable status LEDs, a stable power supply, and as well a host of other connectors. The board is configured and controlled through simple ASCII strings over the Bluetooth RF link or directly through the hardware serial UART.

The first microcontroller 1306 generates the servo signals from the serial signals it gets via Bluetooth board 1301. The second microcontroller 1308 reads the position of three switches seen at 1370 and sends back serial signals via Bluetooth board 1301. The servo microcontroller 1306 can generate PWM signals for 12 servos in parallel with a resolution of 240 steps over 90 degrees rotation. The commands are 2 bytes per servo, one for the ID of the servo, one for the desired position. The sensor microcontroller reads the switch positions and sends back serial signals over the Bluetooth connection to the animatronics server. At initialization time, the sensor microcontroller also produces a sequence of precisely timed commands that it sends to the Bluetooth board and then starts reading the position of the switches and sends serial signals via the Bluetooth link to the remote PC.

Microphone, Speaker and Amplifier

Although the Bluetooth board 1301 has an onboard codec and features a headset output, its audio signal is not strong enough to power a speaker. Therefore, the line out signal is fed into a small 1-watt audio amplifier 1310 to drive a tiny speaker conveniently located in the bushy tail of the squirrel. A microphone 1380 is connected to the Bluetooth board to pickup speech from the user and return it to the remote PC using the audio channel of the Bluetooth link.

Animatronics Server and Sequencer

All of the animatronic creatures described above are controlled remotely by the animatronics control program which executes on the remote PC. The accompanying computer program list appendix contains the source code for this program which serves both as an authoring tool to create low and high-level behaviors, as well as the hub that translates high-level commands from the conversational agent program described earlier to low-level control signals for the creature's movement servos, and transmits sensor signals from the switches in the creature back to the conversational agent. It will be understood that the hub conversion functions may be performed locally in the creature's electronics with the authoring functions to be described next performed by the developer using a PC.

Figure 14:
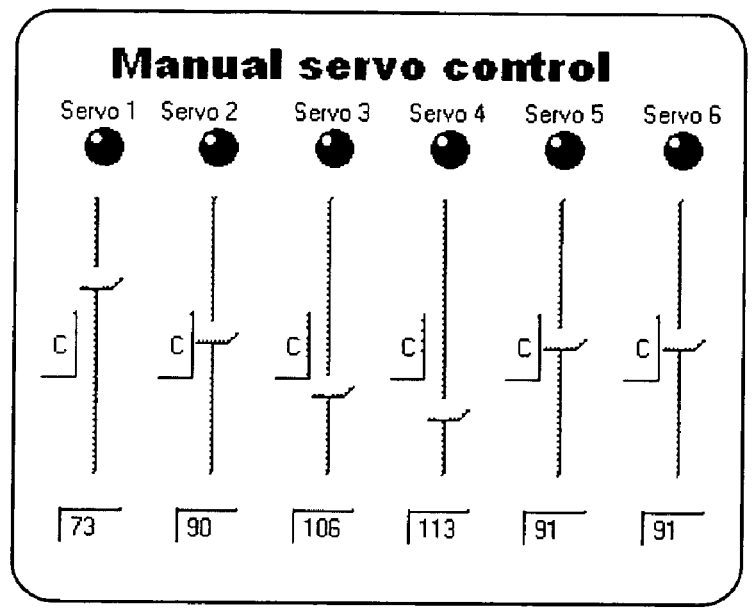
FIG. 14 shows the screen display of a manual servo control used to create motion primitives which drive the servomotors of an animatronic creature.

The animatronics server and sequencer program performs the following functions:
1) Record and modify behavior primitives in loops
2) Compose primitives into behavior sequences
3) Map behavior sequences to agent state changes Creating Behavior Primitives The program provides the character designer who develops movements for a given animatronic creature with a Manual Servo Control whose screen display is seen in FIG. 14, which allows the character designer to manipulate each DOF separately via sliders. As seen in FIG. 14, each of six vertical slider controls may be moved with a mouse and, as it is moved, the position of the servo associated with the slider (channel) moves as well. The instantaneous position of the slider is shown in the display box at the bottom of the slider. In order to find the center, an additional Center button is provided per channel.

Manual Servo Control

The sliders in the manual servo control seen in FIG. 14 are initially moved by the character designer and recorded in a data file which can then be played back to repeat the movement. As noted above, PWM signals can move each servo with a resolution of 240 steps over 90 degrees rotation. The speed of the movement mimics the speed at which the developer moved the slider as the movement date was recorded.

Figure 15:
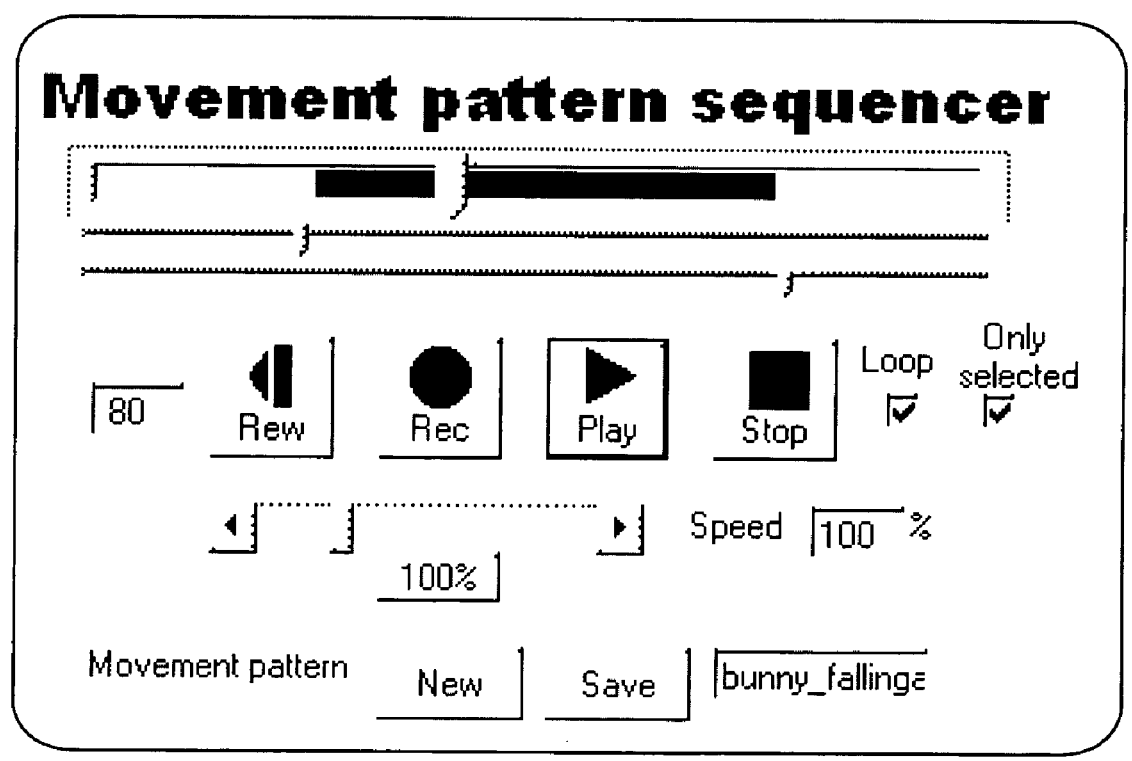
FIG. 15 shows the screen display of a movement pattern sequencer used to create motion primitives which drive the servomotors of an animatronic creature.

Manipulation of manual servo control is used during repeated playbacks of movement primitives under the control of the Movement Pattern Sequencer which produces the screen display seen in FIG. 15, where behavior primitives are created and modified. The standard mode for recording primitives is a loop of 8 seconds, with a sample rate of 40 Hz. The character designer modifies the position of the servos via the sliders in real-time. All changes are recorded automatically "on the fly," and played back during the next loop. If a change is not satisfying, the designer can easily undo it by "overwriting" the change during the next loop. This recording metaphor is similar to the "audio dubbing" method used in movie making, where the actor watches a short scene in a loop, and can keep recording and adjusting the dubs a satisfactory result is achieved.

Movement Pattern Sequencer

Creating primitives in a simultaneous playback/recording loop has proven to be a fast and efficient method. The creature designer teaches the system the desired behavior (by manipulating the sliders), and in a tight loop gets feedback of the system's performance by seeing both the sliders repeat what the character designer just did, as well as seeing how the creature behaves given those slider movements. In addition to direct manipulation via sliders, the character designer has access to each individual data point by text-editing the resulting data file, which guarantees maximum control over the behavior design process.

Once the combination of servo movements which make up a given movement primitive have been produces, the movements can be fine-tuned by reducing (or increasing) the speed of the loop recording and playback, allowing for finer control during the recording process. Furthermore, a primitive might start out as a 8-second loop, but can easily be pruned to a sub-section of the whole sequence by modifying the start and end points of the pattern, The "pruning" is done in a non-destructive way, with the "deleted parts" saved, and can be restored and modified at any time. Once a primitive is built and modified to the designer's satisfaction, it can be stored as a named data file in the Movement Pattern Library, and recalled at any time. To this end, the name of the primitive is entered into the text box seen at the lower right in the Movement Pattern Sequencer control seen in FIG. 15, and the "Save" button is pressed. Note that a saved primitive can be modified and saved under a different name, making it easy to create new primitives which are modified versions of previously created primitives.

Composing Complex Behaviors

On the next level, the behavior primitives that are stored in the library can be composed into behavior sequences. Essentially, a behavior sequence consists of a linearly arranged sequence of primitives.

Figure 16:
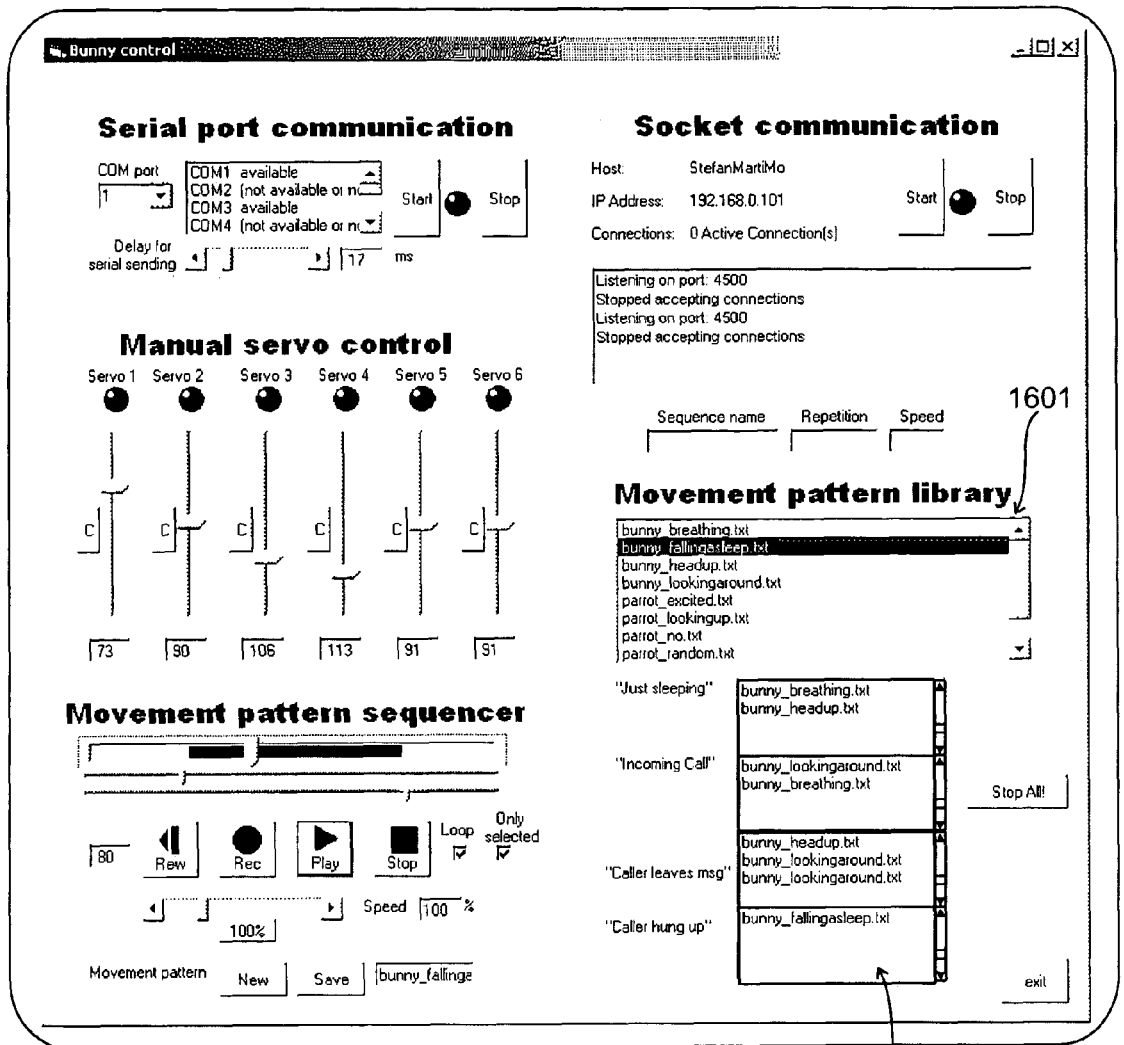
FIG. 16 shows the screen display of the combined controls, including a movement pattern library listing and listing of the primitive files that are combined to form sequences of primitives which drive the servomotors of an animatronic creature.

The entire screen display for the Animatronics server and sequencer program is seen in FIG. 16 and includes a movement pattern library listing at 1601 which identifies and permits the selection of previously named primitive files created using the Movement pattern sequences control seen in FIG. 15. The software allows rapid creation of such sequences by simply dragging and dropping primitives from the pattern library listing at 1601 into one of the lists of other behaviors seen at 1603. Such a composited behavior sequence is stored, and can be played back in three modes:
1) Play back whole sequence once, and then stop
2) Play back all, and then repeat the last primitive
3) Repeat whole sequence until the next behavior command is issued Mapping Behaviors to Agent States Each state change of the conversational agent may trigger behaviors of the animatronics. The cues are high-level descriptions of the agent state, such as "call received", or "caller finished recording a voice instant message," and are mapped to composite behaviors designed by the character designer. For each different animatronic device, the high level cues from the conversational agent are implemented according to its affordances (degrees of freedom, etc). This architecture allows an abstraction of the high level states of the conversation from the implementation of the respective behaviors in the animatronics. Therefore, animatronics with different affordances can get plugged into the same conversational system without the need to adjust the decision tree. This means that a user can choose which Intermediary fits his/her mood, social setting, etc., without having to modify the conversational agent state machine, and lends new meaning to the phrase interface "skins."

The animatronics' behaviors are generated in real-time, depending on the agent-caller interaction. Therefore, factors such as the length of a voice instant message influence the animatronics behavior dynamically.

To create such dynamic behaviors, the conversational agent sends short messages to the animatronics server requesting certain behavior sequences when state changes occur. In addition, the agent can also specify the mode ('play sequence once', 'repeat all', 'repeat last primitive'), and the overall speed for the behavior. If a sequence is requested in 'repeat all' or 'repeat last primitive' mode, the animatronics repeats the behaviors until it receives a new command so the animatronics does not 'freeze' at the end of a sequence.

Interaction Example

The example below shows the relationship between state transitions, the intended animatronics' behavior, and the low-level physical gestures. Although the example is fictitious, the current system works as described.

Joe is in a meeting. His animatronics, a palm-sized bunny with soft furry skin, is sleeping quietly. It is completely curled up, head tucked between its legs, eyes closed firmly and covered by its floppy ears. Every now and then it sighs (moves head twice up and down, 10% of actuator travel) in order to let its owner know that every-thing is ok, it's just asleep. A call comes in, and the bunny twitches slightly in its sleep, as if it had a dream (two sharp head movements, left-right-left-right to 20%, eyes opening 10% then closing again), but is still asleep. The Intermediary then recognizes the caller from caller ID: it's Joe's friend Clara. The bunny sighs, and slowly wakes up (slow head movement up and 30% to the left; at the same time, its eyes start to open slowly to 50%, close again, open twice for 20%; the head shakes slightly left-right-left, then the eyes open, a bit faster now, to 70%.

The agent asks Clara if she wants to leave a voice mail or voice instant message. Clara leaves a voice instant message. During that time, the bunny sits still, looks up as if it would listen to something only it can hear, slowly turning its head from left to right, blinking once in a while. As soon as she is done leaving the message, the bunny gets excited and looks around pro-actively (rapid full movements of the head from one side to another). Joe notices it, and turns his attention towards it. The bunny whispers in his ear and tells him who is on the phone, then plays back the short message it took from Clara. The animatronics is now fully awake and attentive (eyes completely open, head straight). Joe touches the bunny's right ear (which triggers the recording mode) to leave a reply. The bunny sits still, listening (head tilted slightly upwards, blinking fast and of-ten). As soon as Joe is done, it confirms by nodding (medium fast head movement down and then back to middle, followed by single blink). When the message has been delivered to Clara, the bunny looks back at Joe and winks at him, to confirm the delivery (head straight, one eye blinks twice). Then it stretches (head slowly upwards to 100%, then medium fast back to middle), and gets sleepy again (eyes close to 50%, and slowly closing and opening again, twice; at the same time, the head goes slowly down to its belly, halting 2 times in the movement), eventually assuming the same curled up posture it had before the call.

Conversation Finder

The purpose of the Conversation Finger subsystem is to provide the Intermediary with information about the conversational status of the user. This is achieved by utilizing a decentralized network of autonomous body-worn sensor nodes. These nodes detect conversational groupings in real time, and offer the Intermediary information about how many people participate in the user's conversation, as well as if the user is mainly talking or listening.

Each user owns his or her Conversation Finder node, worn close to the neck. It functions as binary speech detector and communicates asynchronously with other nodes on a single radio channel. Each node sends out frequent heartbeat messages over RF, as well as a message when the user is talking, and receives messages from the nodes that are close by. The nodes independently come to a conclusion about who is in the user's current conversation by looking at alignment and non-alignment of the speaking parties. At any time, the Intermediary can query the user's node wirelessly for this continuously updated list of people.

Each node consists of two microcontrollers, a microphone, a transceiver, a microphone preamplifier, and a battery.

Conversational Groupings

In order to detect conversational groupings, the Conversation Finder nodes assume that if two people are in a conversation with each other, their speaking does not overlap for a significant amount of time. A "significant amount of time" may be a culturally biased parameter, but an overlap of 3 seconds has proven to be a useful value in informal tests.

The Conversation Finder can use a messaging protocol that is simple yet efficient. Each message consists of one byte (repeated for error checking purposes). The first nibble is the message ID; the second nibble is the node ID. Each node sends out a HEARTBEAT message every 3000 ms. When the wearer of a node is talking, the node sends out TALK messages continuously, 6 every 200 ms. A 4 bit message space and 4 bit ID space allows for 16 different kinds of commands, as well as 16 different node IDs.

Conversation Finder Hardware

A Conversation Finder node consists of two main elements: an audio part with a microphone, amplifier and a microcontroller to analyze the microphone signal, and a transceiver part with the radio module and yet another microcontroller. The audio part amplifies the microphone signal, then the controller digitizes it with 10 bits, integrating the result over time and providing the transceiver part with a single bit of information specifying whether the user is talking or not. The transceivers in the nodes are Radiometrix© BiM2, which operate in the free 433 MHz spectrum, and have an output of 10 dBm (10 mW) nominal that gives them a range of about 20 meters indoors.

Conversation Finding Software

There are two microcontrollers per node. The audio microcontroller's code is identical for all nodes. In a loop, it adds up one thousand 10 bit samples (which takes 183 ms, resulting in a sampling rate of 5.45 kHz). It then calculates the average value, and raises the talk line in case it is above a certain threshold. In addition to this software threshold, each audio board also contains a potentiometer to adjust the analog amplification level of the microphone preamp. The Transceiver node microcontrollers contain identical code as well, except for that each has a unique node ID.

The transceiver microcontroller runs a main program that consists of a loop that lasts about 200 ms, and contains the following steps:

a. Listen for incoming messages for about 200 ms
b. If the user is talking, send out a TALK message
c. Update internal data structure
d. Keep track of the user's "talk-to-listen" ratios
e. Send out a HEARTBEAT message (every 3000 ms)

The logic of the transceiver node in terms of its internal data structure is as follows: Each node listens for incoming radio messages from nearby nodes. Upon receiving a 'heartbeat,' the other node is classified as Listener. Detecting a 'talk' message will upgrade its status to a Talker. Each node continuously determines if the detected nodes might be part of its owner's conversation or not. If the node's microphone determines that its user is talking, and simultaneously receives 'talk' messages from another node for more than a three-second window, it excludes the other node for a 30-second period by tagging it as Excluded. If a node classified as a Talker stops sending 'talk' messages, it will get re-classified to a Listener after a period of time. Similarly, if a node fails to send out 'heartbeat' messages, it will get tagged as Absent by the other nodes. This continuous process of classifying all other nodes is done in each sensor node independently, and during informal tests with a set of six prototype nodes, this logic demonstrated to be a reliable and fault tolerant source of conversational status information.

The transceiver node also continuously calculates how much the user is talking, versus being quiet or listening. It does so for three different time periods (rolling windows): the last 3.2 seconds, the last 51.2 seconds, and the last 819.2 seconds. The Intermediary can poll these values, providing it with important information about the user's conversational status.

Calculated are these "talk-to-listen" ratios from three hierarchical levels of circular audio buffering. Each buffer's overall result is piped into the next higher buffer's basic slot:

1) First-level buffer: 16 slots (bits), each representing 0.2 seconds. If there was talk activity during the last 200 ms segment, a bit of the first-level buffer is set to high. This first-level buffer covers the last 3.2 seconds.
2) Second-level buffer: 16 slots, each representing 3.2 seconds. If the last first-level buffer (3.2 seconds) contained any talk activity (any of the 16 bits set to high), a bit of the second-level buffer is set to high. This second-level buffer covers the last 51.2 seconds.
3) Third-level buffer: 16 slots, each representing 51.2 seconds. If the last second-level buffer (51.2 seconds) contains more than 50% talk activity (more than 8 of the 16 bits set to high), a bit of the third-level buffer is set to high. This third-level buffer covers the last 13 minutes 39.2 seconds.

Finger Ring

The actuated ring consists of a tiny vibration motor (pager motor with excenter), a 20 mAh lithium polymer battery, a micro switch, Radiometrix Bim2 transceiver (operating in the 433 MHz spectrum), and a PIC 16F877 microcontroller.

The Finger Ring's transceiver receives messages from its user's Conversation Finder node indicating that it has to alert the ring wearer, upon which it vibrates slightly. If the user touches the micro switch located under the ring, the transceiver broadcasts a veto message to the Intermediary.

Messaging Protocol

Although the Finger Ring nodes are part of the Intermediary's sensor network and use the same transceivers as the Conversation Finder nodes, each Finger Ring node only looks for one message type: a message from its Conversation Finder node asking it to vibrate.

This message contains a target ID. If the node receives such a message, it compares the target ID with its own ID. If there is a match, the microcontroller turns on the vibration motor for 1000 ms. This value has been proven to be subtle enough not to interrupt, but still perceivable by the wearer.

After the reception of a valid CONTRACT message, a 10-second window opens. If the user decides to veto to the upcoming interruption, she has ten seconds to press the micro switch attached to the under side of the ring. If she decides to veto, the ring broadcasts a VETO message. This message is anonymous, but contains as a payload the ID of the interrupting agent. This allows for several polling processes at the same time. Therefore, the requesting agent can see if an incoming VETO message is meant for it, but does not know its origin.

If a user presses the micro switch on the ring outside this 10-second window (before or after), a different message (VETO_OWN) is sent out which is addressed specifically to the Finger Ring's own Intermediary. This is done so that the user can use the finger ring for other purposes, like to influence the animatronics, or to pick up an incoming call. To the Intermediary, it is perceived as a button press, similar to the switches in the extremities of the animatronics.

The Finger Ring microcontroller code runs as a loop with the following elements:
1) Listen for incoming messages for 200 ms, and keep track of the user's button presses
2) Send out a veto message if the user has pressed the button
3) Send out a HEARTBEAT message (every 3000 ms)

Sensor Network Hub

All nodes of the sensor network are perfectly able to function on their own, since they are conceived as an adhoc, decentralized network. They are built to interact mainly with each other. However, the Intermediary software is running on a remote PC and needs to communicate with its sensor network somehow. For this purpose, a sensor network hub was build that connects to the serial port of a PC and can interact with the nodes of the sensor network.

Hardware

The hardware involved for the sensor network hub is a BiM2 transceiver connected to a desktop computer. It consists of a small PCB board that houses the transceiver, as well as an RS232 cable (serial) for communication, and a USB cable for power. This transceiver is identical to the transceivers used for the Conversation Finder nodes as well as for the Finger Ring nodes. The main function, though, is to relay socket messages from the Intermediary to the sensor network nodes.

Issue Detection

This section describes the implementation of a specific sub-system of the Intermediary, the Issue detection infrastructure. One part of the Issue Detection infrastructure is a set of PERL scripts that continuously (every hour) captures bags of words from data files which contain text data that is indicative of the user's current interests and work subject matter. These data file preferably include sent mail (separately for message body, quoted text, subject lines, to lines) that have gone through the user's IMAP sent-mail folder as a robotic mail client). In addition, the data files may include the user's To-Do list (web based), and the user's Google web search strings (via modified API).

The system also harvests once a day a bag of words from the user's home pages, for capturing long-term interests. During all harvesting processes, a stop list (a list of commonly used words that are typically not of interest for indexing purposes; such as the most commonly used 10,000 words in the English language).

In addition to the speech recognition server, another piece of software matches the bags of words with the speech recognition output, and returns what it thinks this call is about, and how important this is to the user, by showing the importance levels of the matches it found. Importance for To-Do list entries decay the further down they are in the list. Web searches and sent email message have decaying importance: the further in the past the events are, the less importance they get assigned (subject lines decays slower than message body, though, since they are more concise).

In order to go beyond simple literal word matching, a more sophisticated mapping may be used needed, such as 'fuzzy inferences' between what the caller says and the bags of words.

One option may be to expand the existing bags of words with synonyms, so that "dinner" will match "supper," etc. The right sense of a word could be guessed from the words of the context.

All these fuzzy inference mechanisms would go beyond what CLUES filtering (Marx et al., 1996) is capable of. At the same time, they also increase the bags of words. The speech recognition engine is provided with the bags of words as a dynamic vocabulary (XML file), so that it is more likely to recognize them if they would occur during the conversation. The resulting percentages are then added up, so the Intermediary doesn't look at just one word, but the compound 'relevance' of the recognized words.

As shown in FIG. 3, a message receiver, such as a voice mail system or a voice messaging system, may be employed to record the response of a caller in response to the prompt issued at 301. A speech-to-text converter is for translating the recorded spoken message into a data file containing recognized words, a content analyzer is employed for comparing the recognized words with a database of words known to be of interest to said called person, and an alert generator may then be employed to immediately alert the called person the incoming call if said spoken message is determined to be of probable interest. In this way, a caller with a potentially important message may be permitted to "barge in" to a conversation even though one of the participants has issued a veto which would otherwise prevent the conversation from being interrupted. As noted above, the database of database may consist of words known to be of interest to the called party that is created by collecting words from computer files created by said called person, or the words may be collected from a set of trigger words that are likely to be used in an "emergency"

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. An animatronic telephone agent comprising, in combination,
 a communications subsystem connected to a wired or wireless telephone network for receiving incoming telephone calls, and
 a robotic automaton coupled to said communications subsystem and responsive to said incoming telephone calls for performing different movements that provide non-verbal visual cues to a human observer that are indicative of the status of one of said incoming telephone calls, said status being of the receipt and progress of said incoming call.

2. An animatronic telephone agent as set forth in claim 1 wherein said communications subsystem is housed within said robotic automaton.

3. An animatronic telephone agent as set forth in claim 1 wherein said robotic automaton includes a face with movable eyes or eyelids and wherein at least some of said non verbal cues include the movement of said eyes or eyelids.

4. An animatronic telephone agent as set forth in claim 1 wherein said robotic automaton has movable appendages and wherein at least some of said non-verbal cues include the movement of said appendages.

5. An animatronic telephone agent as set forth in claim 4 wherein said robotic automaton further includes a face with movable eyes or eyelids and wherein at least some of said non verbal cues include the movement of said eyes or eyelids.

6. An animatronic telephone agent as set forth in claim 5 wherein said communications subsystem is housed within said robotic automaton.

7. An animatronic telephone agent as set forth in claim 4 wherein said robotic automaton includes an audio output transducer for delivering audible prompts to said human observer.

8. An animatronic telephone agent as set forth in claim 7 wherein said robotic automaton further includes an a microphone for accepting spoken responses to said audible prompts from said human observer.

9. An animatronic telephone agent as set forth in claim 1 further comprising a programmable controller responding to a status indication from said communications controller by transmitting a sequence of one or more movement commands to said automaton to cause said automaton to produce one of said different movements.

10. An animatronic telephone agent as set forth in claim 9 further comprising an interactive editor for storing command data which associates a sequence of one or more movement commands with each of a set of different status indications.

11. An animatronic telephone agent as set forth in claim 10 further comprising an interactive editor for storing command data which associates a sequence of one or more movement commands with each of a set of different status indications further includes means for combining previously stored sequences of movement commands to store combined sequences for indicative of more complex movements.

12. An animatronic telephone agent as set forth in claim 1 wherein said robotic automaton includes an audio output transducer for delivering audible prompts to said human observer.

13. An animatronic telephone agent as set forth in claim 12 wherein said robotic automaton further includes an a microphone for accepting spoken responses to said audible prompts from said human observer.

14. An animatronic telephone agent as set forth in claim 1 further including at least one input control located on or in said robotic automaton for receiving control commands from said human observer for controlling said communications subsystem.

15. An animatronic telephone agent as set forth in claim 14 wherein said communications subsystem is responsive to one of said control commands for establishing a direct communication connection between said caller and said callee.

16. An animatronic telephone agent as set forth in claim 14 wherein said communications subsystem is further responsive to a second one of said control commands for inhibiting or delaying the delivery of said incoming call or message to said callee.

17. An animatronic telephone agent as set forth in claim 14 wherein said communications subsystem is responsive to one of said control commands for routing selected incoming telephone calls to a voice mail or voice message storage unit.

18. An animatronic telephone agent comprising, in combination,
 a communications subsystem connected to a wired or wireless telephone network for receiving an incoming telephone call, and
 a robotic automaton coupled to said communications subsystem and responsive to said incoming telephone call for performing different movements that provide non-verbal visual cues to a human observer that are indicative of the status of said incoming telephone call,
 wherein said different movements indicate, respectively, that said incoming telephone call has not yet been answered, has been answered and is being recorded, and has been terminated.

19. An animatronic telephone agent as set forth in claim 18 wherein said robotic automatons has movable appendages and wherein at least some of said non-verbal cues include the movement of said appendages.

20. An animatronic telephone agent as set forth in claim 19 wherein said robotic automaton further includes a face with movable eyes or eyelids and wherein at least some of said non verbal cues include the movement of said eyes or eyelids.

21. A communications control system for handling incoming calls or messages from a caller directed to a callee, said control system comprising, in combination,
 an interactive animatronic creature including one or more mechanical actuators for performing a set of pet-like or human-like movement behaviors in response to commands to provide non-verbal cues to said callee,
 a call processor for receiving and handling an incoming telephone call from a caller directed to said callee, said call processor including a call progress monitor for generating status signals indicative of the current status of said incoming call, which current status relates to the receipt and progress of said incoming call, and an animatronic command generator coupled to said call processor and to said interactive animatronic creature for converting at least selected ones of said status signals into movement command signals which are delivered to said mechanical actuators to cause said creature to perform said movement behaviors.

22. A communications control system as set forth in claim 21 further comprising an authoring subsystem for creating and storing a sequence of said movement command signals which, when delivered to said mechanical actuators, produces one of said movement behaviors.

23. A communications control system as set forth in claim 22 wherein said authoring subsystem includes a manual control operable by a human for creating and storing a separate sequence of movement command signals for delivery to a selected one of said mechanical actuators.

24. A communications control system as set forth in claim 23 wherein said authoring subsystem further includes means for modifying said sequence of said movement command signals to create and store a modified sequence of movement commands.

25. A communications control system as set forth in claim 23 wherein said authoring subsystem further includes means for combining all or part of previously created and stored sequences of said movement command signals to create and store a combined sequence of movement commands.

26. A communications control system as set forth in claim 22 wherein said authoring subsystem further includes means for modifying said sequence of said movement command signals to create and store a modified sequence of movement commands.

27. A communications control system as set forth in claim 22 wherein said authoring subsystem further includes means for combining all or part of previously created and stored sequences of said movement command signals to create and store a combined sequence of movement commands.

28. A communications control system as set forth in claim 22 wherein said authoring subsystem further includes means for repeatedly transmitting a selected previously created and stored sequence of said movement command signals to said mechanical actuators and for accepting modifications to said selected previously created and stored sequence to thereby create a modified stored sequence.

29. A communications control system as set forth in claim 22 wherein said authoring subsystem includes a manual control operable by a human developer for creating and storing a separate sequence of movement command signals for delivery to a selected one of said mechanical actuators to cause said selected one of said mechanical actuators to move at a speed that mimics the speed at which said human developer moved said manual control.

30. A communications control system as set forth in claim 22 wherein said authoring subsystem includes a command library subsystem for storing sequences of said movement command signals as named data files.

31. A communications control system as set forth in claim 30 wherein said authoring subsystem includes a means for selecting and combining specific named data files from said command library to create named files containing combined sequences of movement commands.

32. A communications control system as set forth in claim 21 wherein two or more different animatronic creatures having different behaviors may be coupled to said command generator and wherein said command library subsystem stores different sequences of said movement command signals for said different animatronic creatures.

33. A communications control system as set forth in claim 21 wherein said animatronic command generator includes means responsive to a speed control signal.

34. A communications control system as set forth in claim 21 wherein said interactive animatronic creature has movable appendages and wherein at least one of said movement behaviors includes the movement of said appendages.

35. A communications control system as set forth in claim 34 wherein said interactive animatronic creature has one or more movable eyelids and wherein at least one of said movement behaviors includes the movement of said one or more movable eyes or eyelids.

36. A communications control system as set forth in claim 21 wherein said interactive animatronic creature has one or more movable eyes or eyelids and wherein at least one of said movement behaviors includes the movement of said one or more movable eyes or eyelids.

* * * * *